US006556226B2

(12) United States Patent
Gould et al.

(10) Patent No.: US 6,556,226 B2
(45) Date of Patent: *Apr. 29, 2003

(54) METHOD, APPARATUS AND ARTICLE OF MANUFACTURE FOR DISPLAYING CONTENT IN A MULTI-DIMENSIONAL TOPIC SPACE

(75) Inventors: Eric J. Gould, Austin, TX (US); Rachel M. Strickland, San Francisco, CA (US)

(73) Assignee: MonkeyMedia, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/952,908

(22) Filed: Sep. 14, 2001

(65) Prior Publication Data

US 2002/0030702 A1 Mar. 14, 2002

Related U.S. Application Data

(63) Continuation of application No. 09/328,051, filed on Jun. 8, 1999, now Pat. No. 6,326,988.

(51) Int. Cl.[7] .................................................. G06F 3/00
(52) U.S. Cl. ...................................... 345/850; 345/968
(58) Field of Search ................................ 345/700, 744, 345/746, 747, 762, 764, 765, 781, 782, 836, 848–854, 968, 419, 440; 707/1–5, 10, 100, 104.1

(56) References Cited

U.S. PATENT DOCUMENTS

| 5,636,350 A | * | 6/1997 | Eick et al. ................... 345/440 |
| 5,841,440 A | * | 11/1998 | Guha .......................... 345/419 |
| 5,847,708 A | * | 12/1998 | Wolff .......................... 345/764 |
| 6,054,989 A | * | 4/2000 | Robertson et al. ........... 345/727 |
| 6,121,969 A | * | 9/2000 | Jain et al. .................... 345/850 |
| 6,281,899 B1 | * | 8/2001 | Gould et al. ................. 345/848 |
| 6,326,988 B1 | * | 12/2001 | Gould et al. ................. 345/850 |

* cited by examiner

Primary Examiner—Crescelle N. dela Torre
(74) Attorney, Agent, or Firm—Silicon Valley IP Group, LLC; Kevin J. Zilka

(57) ABSTRACT

A computer system utilizing software to map content by determining a field of relevance and at least one topic in the field of relevance is presented. The system determines at least one content pertaining to the topic, retrieves a representation of the content and maps the representation of the content onto the field of relevance. Then, it provides an extremely flexible presentation mechanism where the content is organized by multi-dimensional mappings to present the information effectively. One of the features allows a vector to be assigned to each entity, queries a user or software agent for a particular focal element and displays the multiplicity of distinguishable entities based upon the assigned vectors utilizing the focal vector as a reference point to view the information. The system facilitates the organization of results of database interrogations, web searches and other large data situations, creating a multi-dimensional topic space of content. The invention represents a novel, unique approach that matches nicely with the requirements of the Internet to efficiently examine the results from search engines in an efficient manner.

14 Claims, 27 Drawing Sheets

Figure 3

| FIELD1 | FIELD2 | FIELD3 | FIELD4 | TOPIC DESCRIPTION |
|--------|--------|--------|--------|-------------------|
| 132 - 1 | 134 - 1 | 136 - 1 | 138 - 1 | 140 - 1 |
| 132 - 2 | 134 - 2 | 136 - 2 | 138 - 2 | 140 - 2 |
| 132 - 3 | 134 - 3 | 136 - 3 | 138 - 3 | 140 - 3 |
| 132 - 4 | 134 - 4 | 136- 4 | 138 - 4 | 140 - 4 |
| 132 - 5 | 134 - 5 | 136 - 5 | 138 - 5 | 140 - 5 |
| ⋮ | | | | |
| 132 - 6 | 134 - 6 | 136 - 6 | 138 - 6 | 140 - 6 |
| 132 - 7 | 134 - 7 | 136 - 7 | 138 - 7 | 140 - 7 |

Figure 13

| POINT | LOCATION | POINT | LOCATION |
|-------|----------|-------|----------|
| 700   | 0000     | 718   | 1100     |
| 702   | 0100     | 720   | 1010     |
| 704   | 0010     | 722   | 1001     |
| 706   | 0001     | 724   | 1110     |
| 708   | 0110     | 726   | 1011     |
| 710   | 0011     | 728   | 1111     |
| 712   | 0111     | 730   | 1101     |
| 714   | 0101     |       |          |
| 716   | 1000     |       |          |

Figure 14

| POINT1 | | POINT2 | | POINT3 | | POINT4 | | FACE IDENTIFIER |
|---|---|---|---|---|---|---|---|---|
| LOC | ID | LOC | ID | LOC | ID | LOC | ID | |
| 0000 | 700 | 0100 | 702 | 0010 | 704 | 0110 | 708 | 900 |
| 0000 | 700 | 0100 | 702 | 0001 | 706 | 0101 | 714 | 902 |
| 0000 | 700 | 0010 | 704 | 0001 | 706 | 0011 | 710 | 904 |
| 0001 | 706 | 0011 | 710 | 0111 | 712 | 0101 | 714 | 906 |
| 0010 | 704 | 0011 | 710 | 0111 | 712 | 0110 | 708 | 908 |
| 0100 | 702 | 0101 | 714 | 0111 | 712 | 0110 | 708 | 910 |
| 1000 | 716 | 1100 | 718 | 1010 | 720 | 1110 | 724 | 912 |
| 1000 | 716 | 1100 | 718 | 1001 | 722 | 1101 | 730 | 914 |
| 1000 | 716 | 1010 | 720 | 1001 | 722 | 1011 | 726 | 916 |
| 1001 | 722 | 1011 | 726 | 1111 | 728 | 1101 | 730 | 918 |
| 1010 | 720 | 1011 | 726 | 1111 | 728 | 1110 | 724 | 920 |
| 1100 | 718 | 1101 | 730 | 1111 | 728 | 1110 | 724 | 922 |
| 0000 | 700 | 1000 | 716 | 1100 | 718 | 0100 | 702 | 924 |
| 0000 | 700 | 1000 | 716 | 1001 | 722 | 0001 | 706 | 926 |
| 0100 | 702 | 1100 | 718 | 1101 | 730 | 0101 | 714 | 928 |
| 0001 | 706 | 0101 | 714 | 1101 | 730 | 1001 | 722 | 930 |
| 0010 | 704 | 1010 | 720 | 1110 | 724 | 0110 | 708 | 932 |
| 0010 | 704 | 1010 | 720 | 0011 | 710 | 1011 | 726 | 934 |
| 0110 | 708 | 1110 | 724 | 1111 | 728 | 0111 | 712 | 936 |
| 1011 | 726 | 0111 | 712 | 1111 | 728 | 0011 | 710 | 938 |
| 0000 | 700 | 1000 | 716 | 0010 | 704 | 1010 | 720 | 940 |
| 0001 | 706 | 1001 | 722 | 0011 | 710 | 1011 | 726 | 942 |
| 0100 | 702 | 1100 | 718 | 0110 | 708 | 1110 | 724 | 944 |
| 0101 | 714 | 1101 | 730 | 0111 | 712 | 1111 | 728 | 946 |

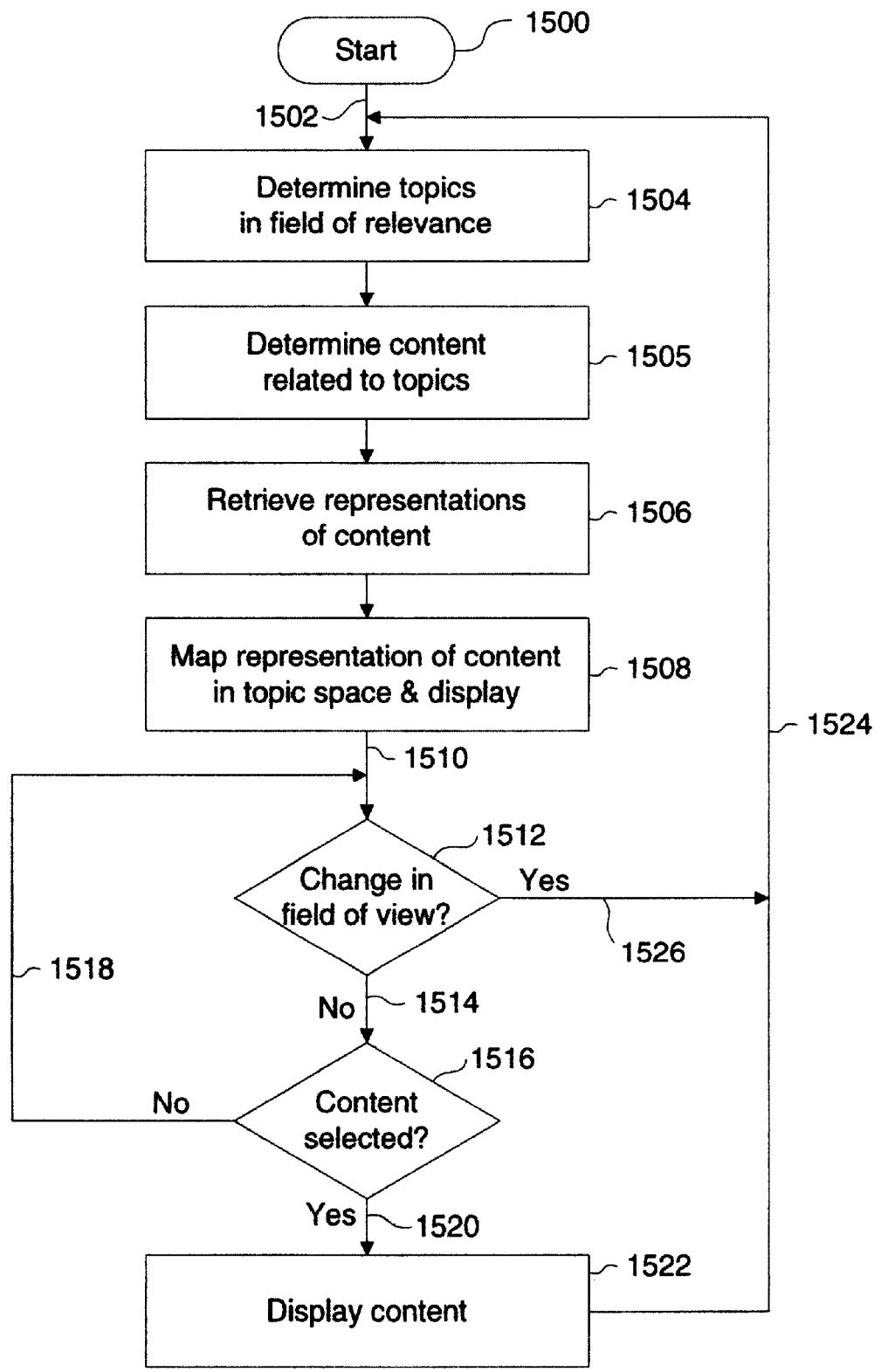

METHOD, APPARATUS AND ARTICLE OF MANUFACTURE FOR DISPLAYING CONTENT IN A MULTI-DIMENSIONAL TOPIC SPACE

This is a Continuation application of prior application Ser. No. 09/328,051 filed on Jun. 8, 1999, now U.S. Pat. No. 6,326,988, the disclosure of which is incorporated herein by reference.

BACKGROUND OF INVENTION

This invention involves creation and display of multi-dimensional content arrangements using a computer.

Content will be considered within this document to refer to at least one instance of text, visual content, audio content or audio-visual content. Visual content as used herein includes still video, motion video and interactive video. Still video is composed of a still frame. Motion video is displayed as a temporal succession of still frames. The exact storage and transfer mechanisms of motion video data are available in a wide variety of mechanisms which are well known to those of skill in the art. Interactive video incorporates at least still video content with an interactive response from at least one user. Certain implementations of interactive video incorporate motion video content as well as interactive user response.

FIG. 1 displays a prior art one-dimensional table of content. Such prior art implementations can be found in a variety of settings, such as channel guides for show times on cable or satellite television in a variety of locations throughout the United States. A video display device enclosure 10, with a display device 12, interfaces with a selector device 18 by a physical transport mechanism 16 to an interface 14.

Relevant prior art display devices 12 are also widely varied in form and specifics of operation. Relevant prior art display devices 12 may present black and white or color images. Relevant prior art display devices 12 may support either a vector or raster format. Relevant prior art display devices 12 may present images in either a 2-D, 3-D or multi-dimensional presentation view or collection of views.

Relevant embodiments of selector device 18 include but are not limited to contemporary television channel selectors, home entertainment center remote controls, computer pointing devices including but not limited to 3-D and 2-D mouse-style pointers, pen tablets, track balls, touch pads and joy sticks. As illustrated in FIG. 1, the selector device communicates via physical transport mechanism 16 with an interface 14 housed in enclosure 10. Relevant physical transport mechanisms 16 include but are not limited to infra-red, micro-wave and other similar wireless transport layers, as well as wires and optical fiber. The mechanism by which communication is carried out based upon the specific physical transport mechanism employed is not relevant to this invention and will not be discussed for that reason. Additional IO devices such as printers and keyboards may be attached to various relevant, prior art systems. Keyboards may house touch pads and mouse sticks which in certain cases are the relevant selector device of that system.

Typical prior art implementations often incorporate a time setting 20 shown here at the top and center of the display area. This can be altered using the selector device 18 to increment forward or backward in time, sometimes traversing days. Note that time setting 20 often incorporates a day and/or date component as well. The time setting 20 often denotes a half hour viewing period starting the displayed time, often referred to as a time slot.

Typical prior art implementations are further composed of multiple rows of information depicted as 22, 30 and 32, each representing specific entertainment events. Each row is typically, further composed of a channel component 24, a show component 26 and a show time component 28. The exact ordering of these components within each row may vary from one implementation to another. The channel component 24 often incorporates a numeric and a call sign designation. The show component 26 often incorporates notations indicating whether there is more detailed programming information available regarding the entertainment represented. The show time component 28 often incorporates a starting time and an ending time.

Typical prior art implementations are used in television systems involving many different channels, frequently supporting over one hundred channels broadcasting simultaneously. It is common for such systems to possess many more channels than can be displayed at one time. Traversal of such implementations is supported by use of specific selector device 18 manipulations, which either change which channels are displayed, the time slot starting time, or trigger playing the content of the entertainment designated by a row.

While such display technology represents a distinct advance over previous approaches to representing and traversing entertainment offering, there are some inherent frustrations. It is difficult if not impossible to perform searches of the entertainment schedule database. The arrangement is fixed, unable to be configured to reflect what the user considers most relevant. One user may focus on team sporting events, while a different user is strongly interested in gardening and travel shows, and yet another user favors news shows and court room news shows. When the user interests cross more than one standard topic area there is no mechanism to support selection and access by users today. What would be useful is a flexible, user configurable interface to a sorting engine, which could sort an entertainment content database, based upon user selected fields of relevance which could then be traversed with content to be played selected and played.

FIG. 2 presents a display of a prior art two-dimensional table of contents. Various simulated buttons appear on the display file 52, edit 54 and 56. There is also a background area 12, a button area 50, a vertical slider bar area 70, and a vertical scroll bar 72. A horizontal scroll bar area 74 and a horizontal scroll bar 76 are also provided to move the display area in a horizontal two-dimensional manner. Various columns 60, 62 63, 64 and 66 are also provided to organize information in two-dimensional columnar fashion and similarly, there are rows provided to further organize information. Finally, tabs 80, 82, 84, 86 and 88 are also provided to further organize information into tabbed partitions giving the illusion of another dimension of organization. However, all of the organizational devices are pre-defined mechanisms that must be carefully defined to match the information in a manual manner by a user. The two-dimensional organization is clumsy and bulky and would not lend itself to multi-dimensional, free form information.

SUMMARY OF THE INVENTION

A method in accordance with a preferred embodiment includes logic that maps content by determining a field of relevance and at least one topic in the field of relevance. The method determines at least one content pertaining to the topic, retrieves a representation of the content and maps the representation of the content onto the field of relevance. This method advantageously provides an extremely flexible presentation mechanism where the content may be organized by multi-dimensional mappings to show relevance in multiple dimensions that may vary through presentation of the content.

This method facilitiates the organization of results of database interrogations, web searches and other large data situations, creating a multi-dimensional topic space of content and the tools to navigate the space effectively. The method advantageously supports use of a created multi-dimensional topic space by determining the focal vector and displaying the distinguishable entities. The resultant interface is an ergonomic, natural way to permit the traversal of otherwise large, unwieldy databases. The invention represents a novel, unique approach that matches nicely with the requirements of the Internet to efficiently examine the often enormous results from search engines in a reasonable amount of time and effort. The invention is further responsive to either user or software agent direction.

The invention comprises a computer device containing software that enabling a navigation tool for a multi-dimensional topic space implemented on a computer readable medium comprising a multi-dimensional vector space and a multiplicity of content elements. Each of the content elements includes a location in the multi-dimensional vector space; and a content representation. This content storage provides a multi-dimensional approach to referencing and managing content, supporting access and traversal by a variety of mechanisms based upon a paradigm of the multi-dimensional vector space.

These and other advantages of the present invention will become apparent upon reading the following detailed descriptions and studying the various figures of the drawings.

BRIEF DESCRIPTION OF THE DRAWINGS

FIG. 3 displays a relevance field versus topic space mapping as a table in accordance with an embodiment of the invention;

FIG. 13 is a tabular graph of points of the four dimensional cube of FIG. 12 and the locations of those points in the four dimensional space in accordance with a preferred embodiment;

FIG. 14 is a tabular graph of the two dimensional faces of the four dimensional cube, their identification numbers and the named points and their locations in each two dimensional face in accordance with a preferred embodiment;

FIG. 20 is a flowchart of a method of displaying, traversing, and displaying content in a multi-dimensional topic space in accordance with a preferred embodiment;

DETAILED DESCRIPTION OF THE PREFERRED EMBODIMENTS

Figure 1:
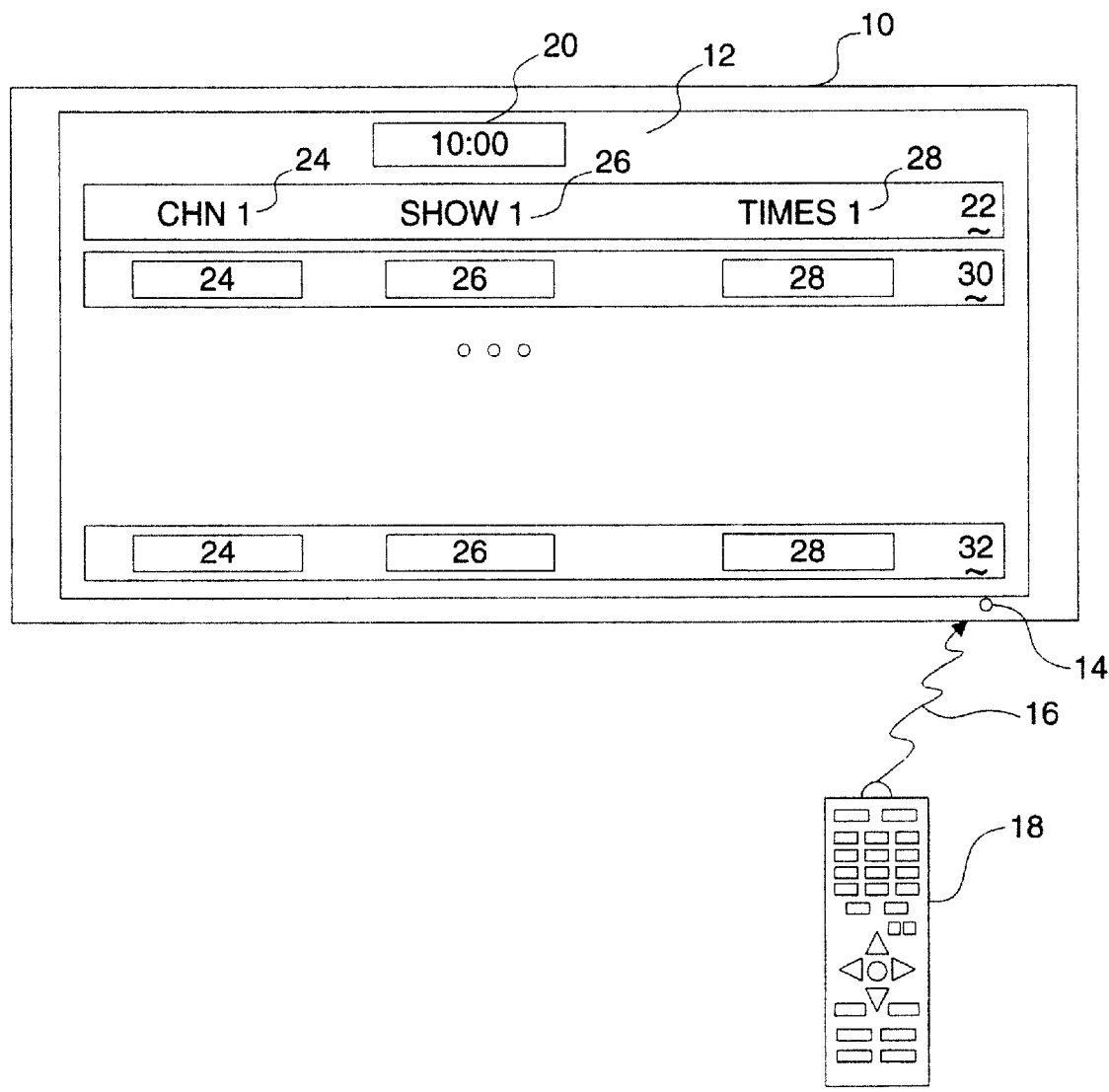
FIG. 1 illustrates a prior art one-dimensional table of content.
Figure 2:
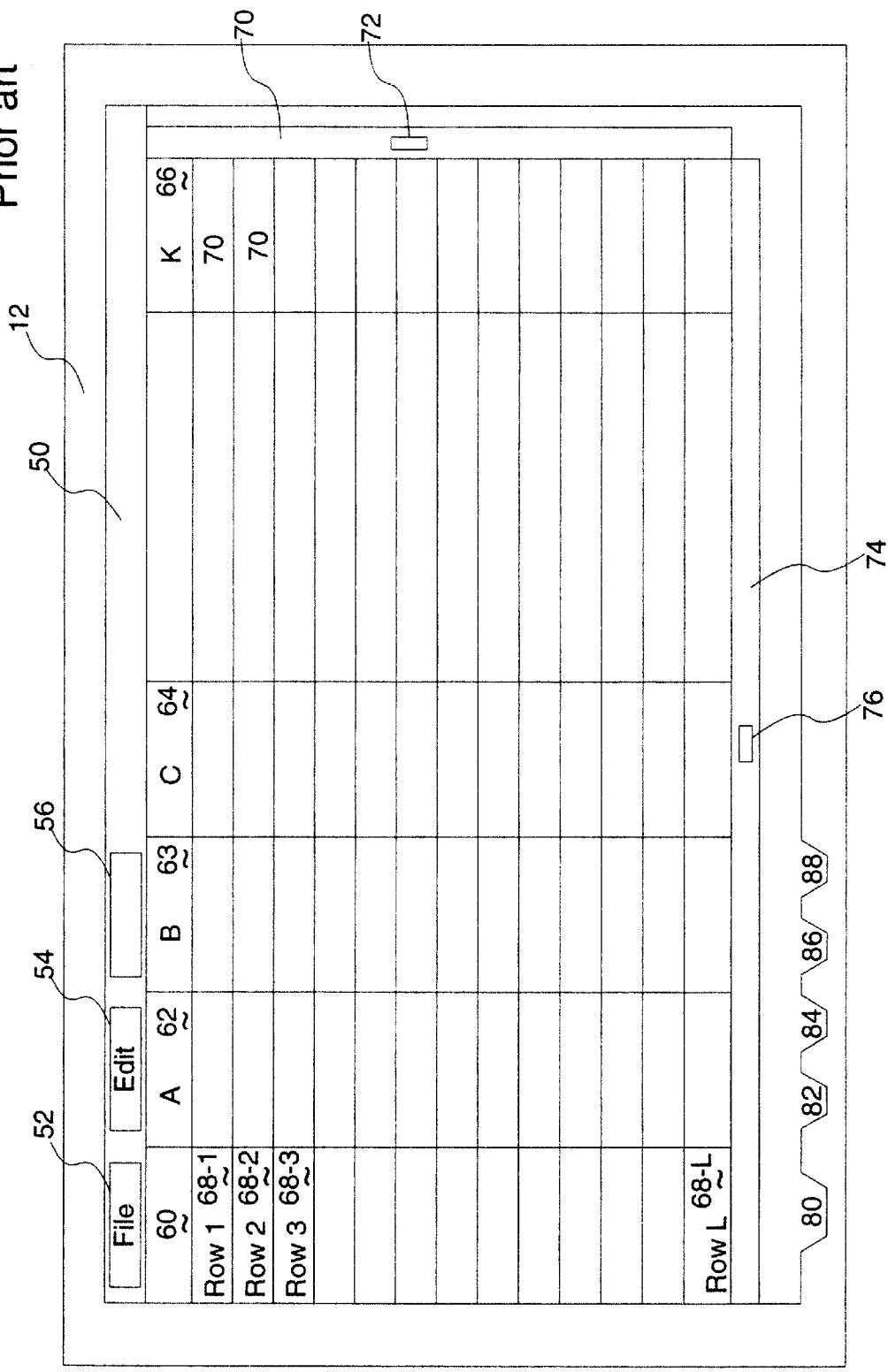
FIG. 2 displays a prior art two-dimensional table of content.

FIGS. 1 and 2 were discussed previously with reference to the prior related art. A display in accordance with a preferred embodiment has the capability of displaying information as multi-dimensional, visual information. In addition the display can also convey audio or tactile information to present for example, surround sound location, environmental feel and even such qualities as heat or texture. FIG. 3 displays a relevance field versus topic space mapping as a table in accordance with an embodiment of the invention. Multi-dimensional as used in this document refers to information spans at least two axes providing an ordering in as many dimensions as there are axes. Thus, two-dimensional organization refers to two axes providing a two dimensional ordering. Three-dimensional organization refers to three axes providing a three dimensional ordering. Four-dimensional organization refers to four axes providing a four dimensional ordering. Five-dimensional organization refers to five axes providing a five dimensional ordering. And so on.

A field of relevance as used in this document refers to axes in a multi-dimensional organization. Two or more fields of relevance may be either interdependent or independent.

A topic refers to any entity that may appear on a display or is associated with content that appears on the display, which may be either a single location or a collection of locations in a multi-dimensional organization. Content entities may further be related to topics that provide an organizational mechanism for information. The term mapping as used in this document refers to translating a particular dimension to a particular content entity to provide organization and navigational features for the content.

The first row 100 of the table in accordance with a preferred embodiment contains headings for the various columns of the table 102, 104, 106, 108 and 110. Cell 102 contains a heading for a field of relevance also labeled as FIELD1. Cell 104 contains a heading for a field of relevance also labeled as FIELD2. Cell 106 contains a heading for a field of relevance also labeled as FIELD3. Cell 108 contains a heading for a field of relevance also labeled as FIELD4. Cell 110 contains a heading for a topic also labeled as TOPIC DESCRIPTION.

In accordance with a preferred embodiment, there may be fewer fields of relevance evidenced by fewer columns in such a table. There may be more fields of relevance evidenced as more columns in such a table. All the topics may be present in a single table similar to this, or at least two tables, with different fields of relevance, may be used to map some or all of the topics to these different collections of fields of relevance or the number of fields of relevance in these different tables may vary from one table to another. What has been described above as columns can be implemented as rows and what has been described above as rows may instead be implemented as columns. In other alternative embodiments, what has been described as a row may be implemented as an instance of a data structure or object class. In other alternative preferred embodiments of the invention, what has been described as a row may be implemented as a linked list, with the entire table being further implemented as a linked list of linked lists.

In accordance with a preferred embodiment, the cells of a specific column of the table are associated with a field of relevance. Cells of a specific column can be organized as a specific collection of acceptable values in certain preferred embodiments of the invention. The acceptable value collection may be implemented as a binary set. Examples of such preferred embodiment implementations include but are not limited to {0, 1}, {TRUE, FALSE} or {MALE, FEMALE}. The acceptable value collection may be implemented as a finite set of discrete elements in certain further preferred embodiments of the invention. Examples of such preferred embodiment implementations include but are not limited to {RED, GREEN, BLUE} or {CANADA, FRANCE, MEXICO, UK, US}.

Alternatively, the acceptable value collection may be implemented as a set of numeric elements. Examples of such preferred embodiment implementations include but are not limited to a specific numeric notation, such as bit length of integers or a specific floating pointing notation. The acceptable value collection may be further implemented as a set, which is a specified numeric range, in certain further preferred embodiments of the invention. Examples of such preferred embodiment implementations include but are not limited to a percentages (which may be represented as integers, fixed point or floating point numbers) or a specific floating pointing range [−1.234 to $\pi/4$]. The acceptable value collection may be implemented as a set of elements, each element being a specific numeric range, in certain further preferred embodiments of the invention. Examples of such preferred embodiment implementations include but are not limited to sets of percentage ranges with elements such as [0% to 10%] and [15% to 100%] as well as numeric ranges with elements such as [−5 to +3.12159] and [all numbers at least as big as 10.512] and [all numbers not larger than −1234].

Figure 4:
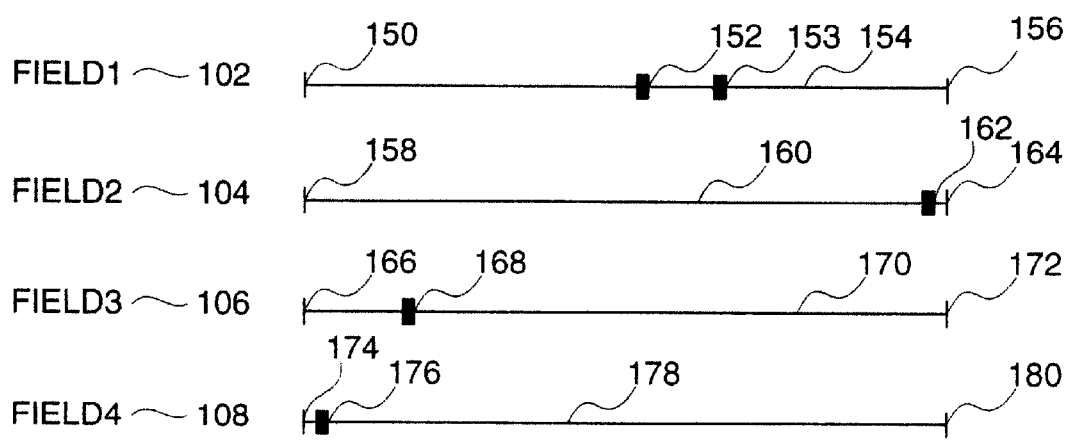
FIG. 4 displays an independent salience weighting mechanism in accordance with an embodiment of the invention.

FIG. 4 displays an independent salience weighting mechanism in accordance with an embodiment of the invention. A field of relevance FIELD1, denoted by 102, has an associated slider represented by line 154 with endpoints 150 and 156. Slider 154 uses points 152 and 153 representing a range of relevance in certain preferred embodiments. In certain preferred embodiments, point 153 is not visible and point 152 then represents a specific relevance value.

Field of relevance FIELD2, denoted by 104, has an associated slider represented by line 160 with endpoints 158 and 164. Slider 160 setting 162 is shown at the endpoint 164. In certain further preferred embodiments, additional interface controls, such as arrow buttons are implemented to extending the range of the slider on one or both ends of the line 160.

Field of relevance FIELD3, denoted by 106, has an associated slider represented by line 170 with endpoints 166 and 172. Slider 170 setting 168 is between endpoints 166 and 172. In certain preferred embodiments, the setting 168 may visit a limited collection of values, sometime as little as two values.

Field of relevance FIELD4, denoted by 108, has an associated slider represented by line 178 with endpoints 174 and 180. Slider 178 setting 176 is approximately at endpoint 174. In certain further preferred embodiments, additional interface controls, such as arrow buttons are implemented to extending the range of the slider on one or both ends of the line 178.

Figure 5A:
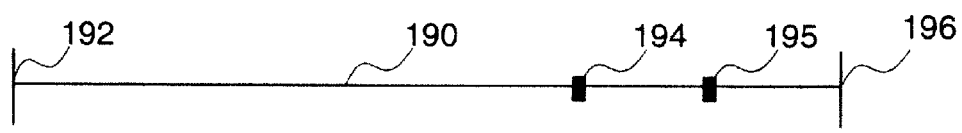
FIG. 5A displays an interdependent salience weighting of two relevance fields in accordance with an embodiment of the invention.

FIG. 5A displays an interdependent salience weighting of two relevance fields 190 in accordance with a preferred embodiment. The points 192, 194, 195 and 196 represent particular data associated with a field of interest. FIG. 5A illustrates that data split between two vertices can be represented on a line. The closer to one end of the line or another is an indication of how strong the influence of the end's characteristics play in the datum being represented. Points 192 and 196 represent the endpoints of the range of relevance between the two fields of relevance in certain preferred embodiments. Points 194 and 195 represent a range of relevance in certain preferred embodiments. In certain preferred embodiments, point 195 is not visible and point 194 then represents a specific ratio of relevance between the two relevance fields.

Figure 5B:
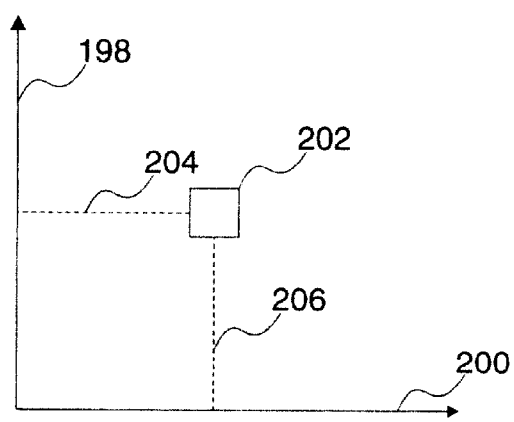
FIG. 5B displays an independent salience weighting of two relevance fields in accordance with an embodiment of the invention.

FIG. 5B displays an independent salience weighting of two relevance fields in accordance with an embodiment of the invention. The first relevance field is plotted on the X axis 200 and the second relevance field is plotted on the Y axis 198. The intersection of a particular relevance field in the Y axis 204 and a relevance field in the X axis 206 is shown at point 202 which represents the interdependent salience weighting.

Figure 6A:
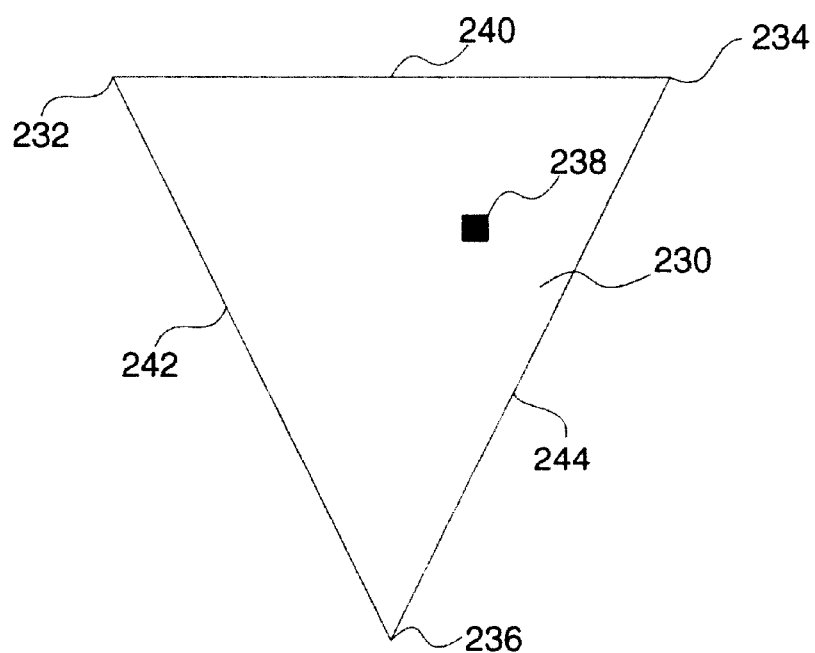
FIG. 6A displays an interdependent salience weighting of three relevance fields.

FIG. 6A displays an interdependent salience weighting of three relevance fields in accordance with an embodiment of the invention. The three relevance fields represent a way of plotting three vectors 240, 242 and 244 which determine a unique area 230 determined by the points 232, 234 and 236 that form a triangle. Certain unique areas within the relevant field are also defined 238. Data split between three vertices can be represented in a triangle as shown in FIG. 6A. Data points located at the vertex 232, 234 and 236 are wholly related to one variable and not at all to the other two. Moreover, data points located on one edge may be influenced by two of the vertices but not at all by the third, and data points located with the space of the triangle 238 would be to varying degrees influenced by all three of the vertices 232, 234 and 236. Finally a data point located at the center of the triangle, would be equally influenced by the three vertices 232, 234 and 236.

Figure 6B:
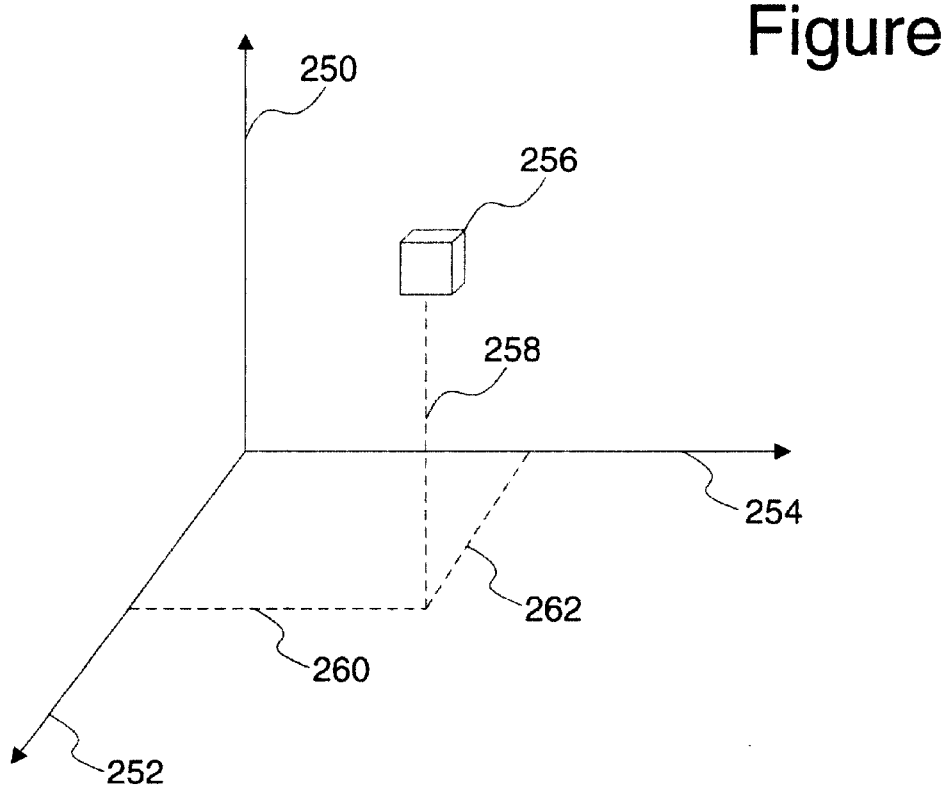
FIG. 6B displays an independent salience weighting of three relevance fields in accordance with an embodiment of the invention.

FIG. 6B displays an independent salience weighting of three relevance fields represented as a three dimensional plot in accordance with a preferred embodiment. A first relevance field is plotted on the X axis 254, a second relevance field is plotted on the Y axis 250 and a third relevance field is plotted on the Z axis 252. A particular set of defining vectors 260, 262 and 258 uniquely define a volume 256 representing a particular independent salience weighting in accordance with a preferred embodiment, where the defining vectors 260, 262 and 258 are seen as ranges on the respective coordinate axes.

Figure 7A:
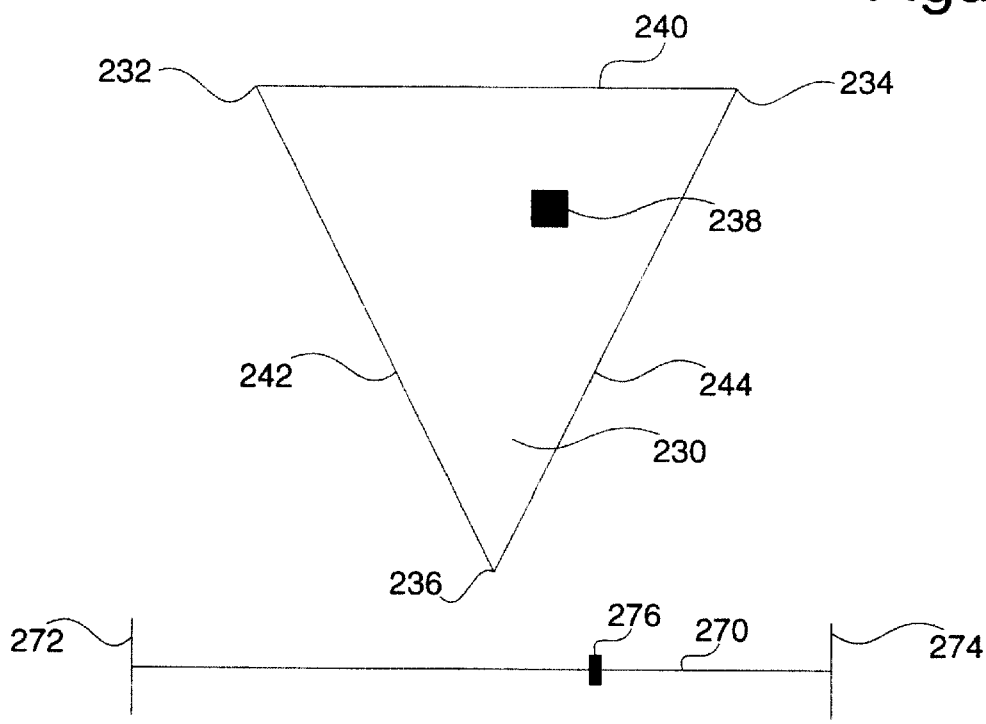
FIG. 7A displays an interdependent salience weighting of four relevance fields using a triangle and a slider in accordance with an embodiment of the invention.

FIG. 7A displays an interdependent salience weighting of four relevance fields using a triangle and a slider in accordance with a preferred embodiment. Three relevance fields are plotted as a triangle as described with reference to FIG. 6A. Then, a slider 270 represented as a line segment with endpoints 272 and 274 is used to provide a fourth relevance field and when a point such as 276 is selected on the slider bar, it uniquely defines the area 238 in the triangle. Area 238 may be regarded as the product of ranges of interdependent fields of relevance in certain preferred embodiments.

Figure 7B:
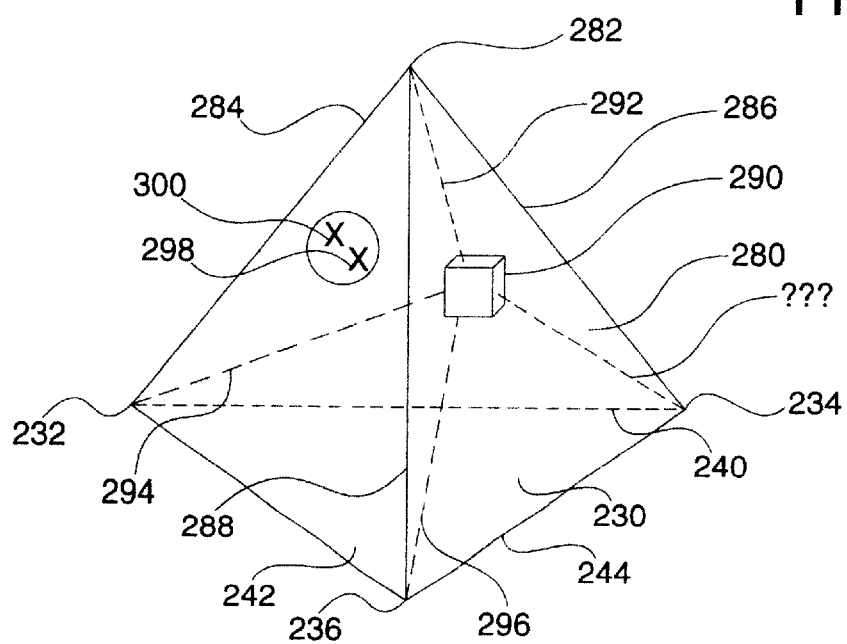
FIG. 7B displays an independent salience weighting of four relevance fields using a tetrahedron in accordance with an embodiment of the invention.

FIG. 7B displays an independent salience weighting of four relevance fields using a tetrahedron in accordance with an embodiment of the invention. In this Figure, three triangles 230, 242 and 280 are combined with two points 298 and 300 just below the face of the triangle 242 to uniquely define an enclosed region 290. Region 290 in certain preferred embodiments may be chosen to be a rectangular prism or "cube". Region 290 in certain preferred embodiments may be chosen to be a tetrahedron. Adding a fourth vertex naturally results in a tetrahedron as illustrated in FIG. 7B where the rules of a three sided form would be multiplied by four (one set of three for each side), and thickened by the three dimensional space residing within the tetrahedron, the space providing a space for varying degrees of influence by all four vertices. A problem arises in trying to fit this model onto a two dimensional display device using opaque representations such as photographic or video still images.

To begin to solve this problem, the model was simplified by eliminating the inner space where all four vertices interact and by placing data at discrete locations between vertices. Effectively, a surface is defined on which data points can be located and modeling this surface as a virtually three dimensional object. A camera, represented by the screen display, is placed at the center of the object looking out at the surface and the observer is given a means for moving around the outside of the object to view all the sides of the surface. This allows the user to navigate around the space, select and focus on data points of interest residing on the virtual display surface and observe the object in detail.

Figure 8A:
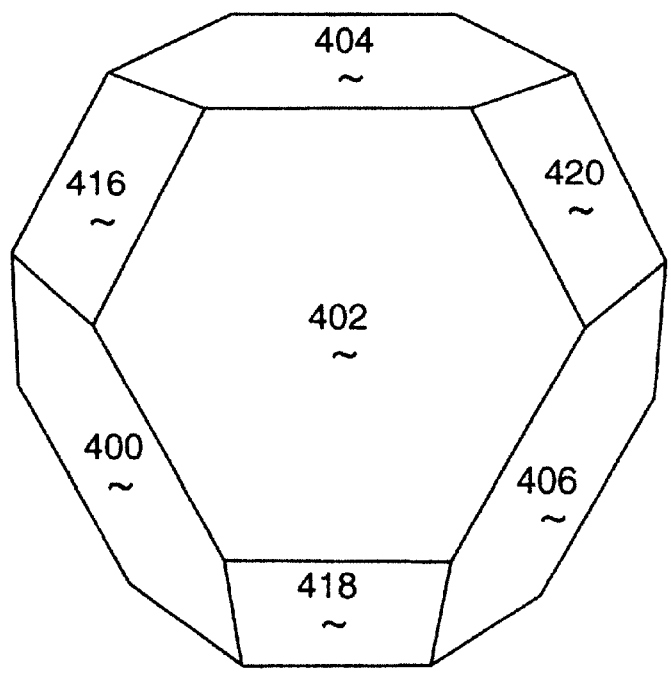
FIG. 8A displays a truncated octahedron composed of planar faces as used in accordance with an embodiment of the invention.
Figure 8B:
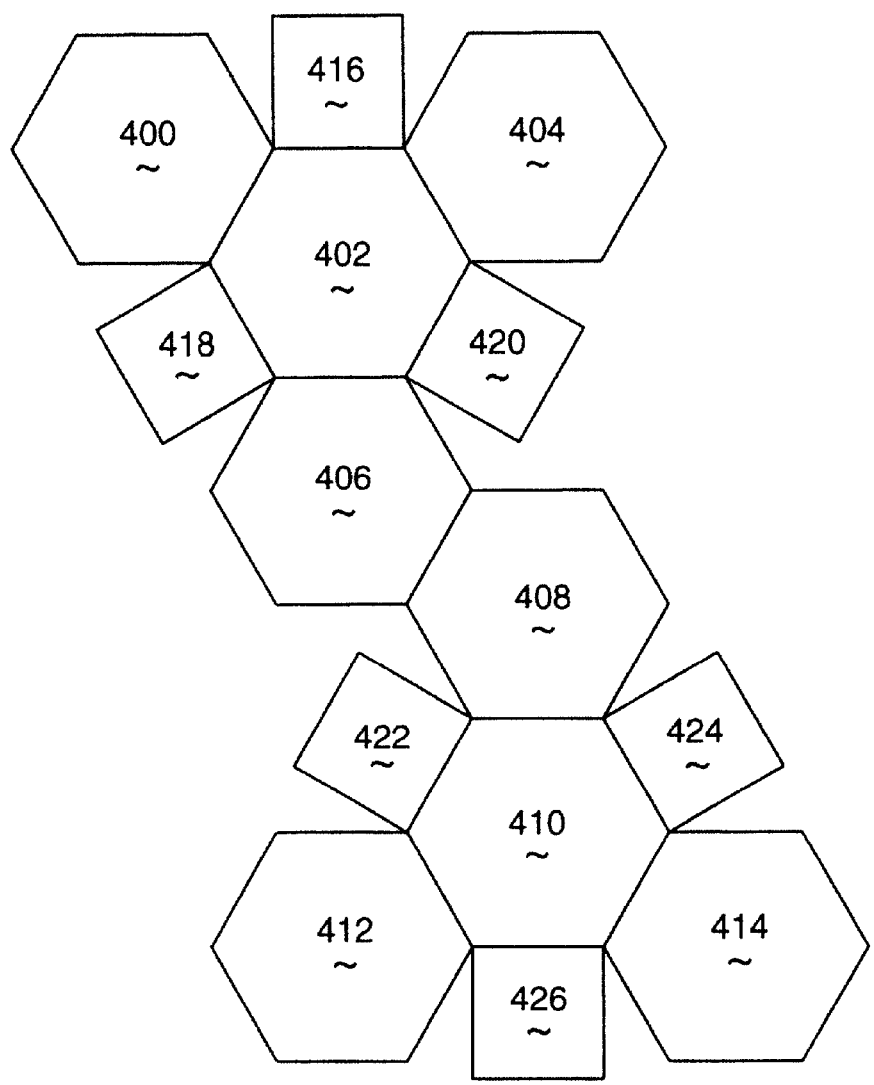
FIG. 8B displays the planar faces of the truncated octahedron of FIG. 8A as used in accordance with an embodiment of the invention.

The model utilizes the limited placement of data points, so for example, a point located on the vertex, a point halfway between two vertices and a point midway between three vertices. The resultant form is one in which each potential datum placement location forms a flat side of a fourteen sided object as illustrated in FIG. 8A and FIG. 8B. On these flat sides sit the opaque representations. The space of a vertex is represented by a hexagon, the space between two vertices is a square and the space between three is again a hexagon.

FIG. 8A illustrates a truncated octahedron composed of planar faces as used in accordance with an embodiment of the invention. The surfaces that make up the truncated octahedron are shaped much like a soccer ball, and when they are cut to transform a three-dimensional object into a two-dimensional object, the resultant surface is illustrated in FIG. 8B. FIG. 8B displays the planar faces of the truncated octahedron of FIG. 8A in accordance with a preferred embodiment.

Figure 9:
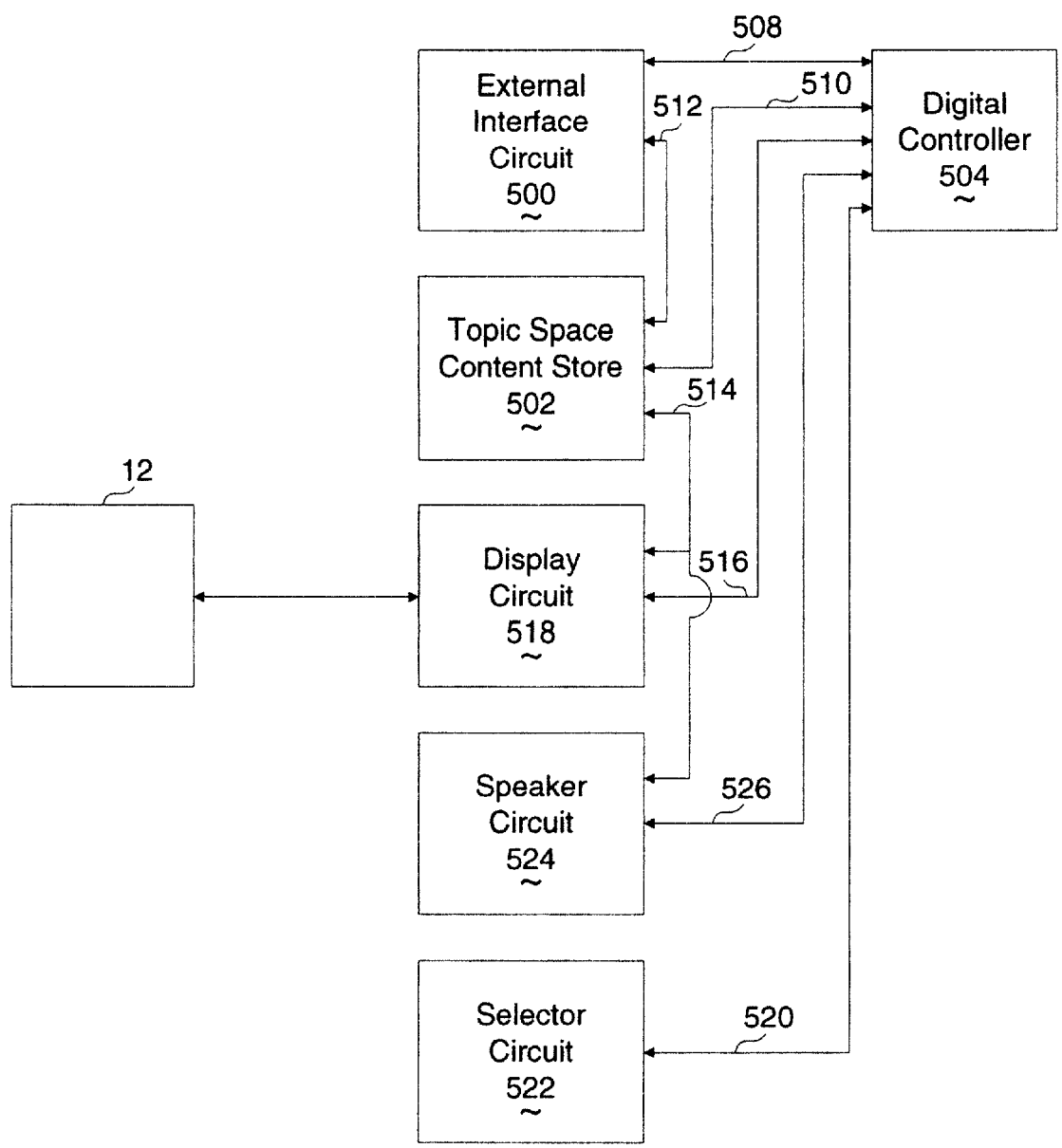
FIG. 9 displays the system block diagram of an apparatus in accordance with an embodiment of the invention supporting the making, displaying, traversal and playing of a multi-dimensional topic space.

FIG. 9 displays the system block diagram of an apparatus in accordance with an embodiment of the invention supporting the making, displaying, traversal and playing of a multi-dimensional topic space. The apparatus includes an external interface circuit 500, writeable content store 502, digital controller 504, display circuit 518 and selector circuit 522 and speaker circuit 524. Digital controller 504 embodiments include but are not limited to one or more of the following: general purpose microprocessors, DSPs, parallel processors, embedded controllers and special purpose system controllers. General purpose microprocessors include but are not limited to various word width CISC and RISC. DSPs include but are not limited to various word width computers employing instruction sets allowing at least one add/subtract operation as well as at least one operation comparable to multiplication to be performed in a single instruction cycle. Parallel processors include but are not limited to SIMD, MIMD, and hybrid SIMD/MIMD organizations of either uniform or non-uniform processors.

Digital controller 504 embodiments further include but are not limited to one or more microprocessors or DSPs along with additional circuitry performing specialized data processing. Digital controller 504 embodiments may further include but are not limited to capabilities for MPEG stream partitioning and/or decoding, copy protection processing, decryption, authentication and block data error detection and correction. Digital controller 504 embodiments may further include but are not limited to various implementations as PLAs, CPLDs, FPGAs, ASICs and ASSPs.

Digital controller 504 embodiments may further include but are not limited to local memory resources in the form of RAM and/or nonvolatile memory and may further include but are not limited to various forms of RAM and one or more caching banks of RAM. Digital controller 504 embodiments of the invention may further include but are not limited to one or more of memory caches physically proximate to and possibly contained within the digital controller 504 embodiments package or packages. Memory caching may include but is not limited to separate caching of memory and data. Memory caching may further include but is not limited to multiple layers of cache structures. Distinct processors within the digital controller 504 embodiments of the invention may further possess distinct caches as well as further localized memory which may in turn include RAM and/or nonvolatile memory. Digital controller 504 embodiments of the invention nonvolatile memory may further include but is not limited to boot ROMs and flash memory circuits which may further emulate disk drives with a form of file management system.

The external interface circuit 500 is coupled to digital controller 504 as shown by arrow 508. One external interface circuit 500 embodiment of the invention incorporates a RF tuner including but not limited to demodulators and/or modulators for various broadcast protocols such as FM, FDMA, TDMA, various spread spectrum protocols, Wavelength Division Multiple Access and wavelet division multiple access. Embodiments of external interface circuit 500 RF tuners may employ wireline or wireless physical transport layers. Embodiments of external interface circuit 500, wireline physical transports include but are not limited to twisted pair, coaxial cable and various optical fiber mechanisms. Embodiments of external interface circuit 500, wireless physical transports include but are not limited to contemporary broadcast television, HDTV, as well as various radio frequency, microwave and infra red implementations which incorporate an antenna, sensor or array of antennas or sensors.

Certain preferred embodiments of external interface circuit 500 include but are not limited to modems. Embodiments of external interface circuit 500, modems include but are not limited to telephone line modems incorporating various transceiver rates which may not be the same for reception as for transmission, as well as various DSL, ADSL, XDSL, ISBN, Ethernet, Token Ring and ATM interfaces. Embodiments of external interface circuit 500, modem physical transport layers include but are not limited to wire line and wireless transport layers. Embodiments of external interface circuit 500, modem wire line physical transport layers include but are not limited to telephone lines, twisted pair wire lines, coaxial cabling and various optical fiber technologies. Embodiments of external interface circuit 500, modem wireless transport layers include but are not limited to directional and non-directional radio, microwave, infrared and optical schemes.

Embodiments of external interface circuit 500 may access external content located at a substantial distance, often embodied within a server supporting a network of user systems via interconnections embodiments of external interface circuit 500. Such networks may further support TCP/IP thereby enabling support for the Internet. Such networks may further support one or more Intranets. Such networks may further support one or more Extranets.

Embodiments of external interface circuit 500 may include but are not limited to video input devices, often possessing external interfaces including video frame capturing circuitry. Embodiments of external interface circuit 500 may further include image processing circuitry further supporting MPEG compatible compression and/or decompression of the captured video stream.

Coupling 508 can be implemented as a set of connections directly between external interface circuit 500 and digital controller 504 in certain preferred embodiments of the invention. This coupling 508 can also be implemented as a shared set of connections with other circuitry in other preferred embodiments of the invention. Further preferred embodiments include effecting these couplings as transactions on the shared set of connections. Further preferred embodiments of the invention include these shared connections forming a bus possessing a bus protocol. Further preferred embodiments of the invention include the bus supporting a digital bus protocol. Other preferred embodiments of the invention include the bus supporting and encoded digital signaling within an essentially analog protocol, including but not limited to protocols such as Firewire (P1394) and other optical fiber communications protocols.

The external interface circuit 500 is also coupled to writeable content store 502 as shown by arrow 512. Coupling 512 may be effected by a dedicated interconnection in certain preferred embodiments of the invention. Coupling 512 may be further effected by a shared interconnection with other couplings, such as coupling 508 in certain further preferred embodiments.

The writeable content store 502 is coupled to a digital controller 504 as shown by arrow 510. This coupling 510 may be a direct interface to digital controller 504 as a collection of electrical connections to electrical contacts between the package of digital controller 504 and writeable content store 502. In certain other preferred embodiments of the invention, the coupling 510 may be effected by a high speed communications line including but not limited to Fiber Channel or ATM-SONET between digital controller 504 and writeable content store 502.

The writeable content store 502 is coupled to a display circuit 518 as shown by arrow 514. This coupling 514 in certain preferred embodiments of the invention may be a direct interface between display circuit 518 and writeable content store 502. In certain other preferred embodiments of the invention, the coupling 514 may be effected by a high speed communications line including but not limited to Fiber Channel or ATM-SONET between display circuit 518 and writeable content store 502.

Display circuit 518 is coupled to digital controller 504 as shown by arrow 516. This coupling 516 in certain preferred embodiments of the invention may be a direct interface between display circuit 518 and writeable content store 502. In certain other preferred embodiments of the invention, the coupling 516 may be effected by a high speed communications line including but not limited to Fiber Channel or ATM-SONET between display circuit 518 and writeable content store 502. Display circuit 518 embodiments may further include but are not limited to capabilities for MPEG stream partitioning and/or decoding, copy protection processing, decryption, authentication and block data error detection and correction.

Selector circuit 522 is coupled to digital controller 504 by arrow 520. This coupling 516 in certain preferred embodiments of the invention may be a direct interface between display circuit 518 and writeable content store 502. In certain other preferred embodiments of the invention, the coupling may be effected by a communications line protocol including but not limited to RS-232, USB or RS-485 between display circuit 518 and writeable content store 502.

Note that in certain preferred embodiments of the invention, display circuit 518 includes but is not limited to format translation capabilities. In further preferred embodiments of the invention, the format translation capabilities further include and are not limited to MPEG stream decompression capabilities. In other further preferred embodiments of the invention, the format translation capabilities include wavelet algorithmic decompression capabilities. In other further preferred embodiments of the invention, the format translation capabilities include fractal algorithm decompression capabilities. Further preferred embodiments of the invention include but are not limited to 3-D displays as well as multiple perspective displays of higher dimensional continuous content.

Speaker circuit 524 is coupled to digital controller 504 as shown by arrow 526. In certain preferred embodiments of the invention, coupling 526 is implemented as a separate physical interface such as wires directly coupling speaker circuit 524 to digital controller 504. In other preferred embodiments of the invention, coupling 526 is implemented as a collection of at least one kind of bus transaction on a shared bus. In further preferred embodiments of the invention, the shared bus is a USB bus. In other further preferred embodiments of the invention, the shared bus is an ISA bus.

In certain preferred embodiments of the invention, speaker circuit 524 may share coupling 514 to topic space content store 502 with display circuit 518. In certain preferred embodiments, this shared coupling may be implemented as a shared bus with addressable devices. Note that further preferred embodiments include but are not limited to audio presentation circuitry. Further preferred embodiments include but are not limited to force feedback tactile interfaces.

Figure 10A:
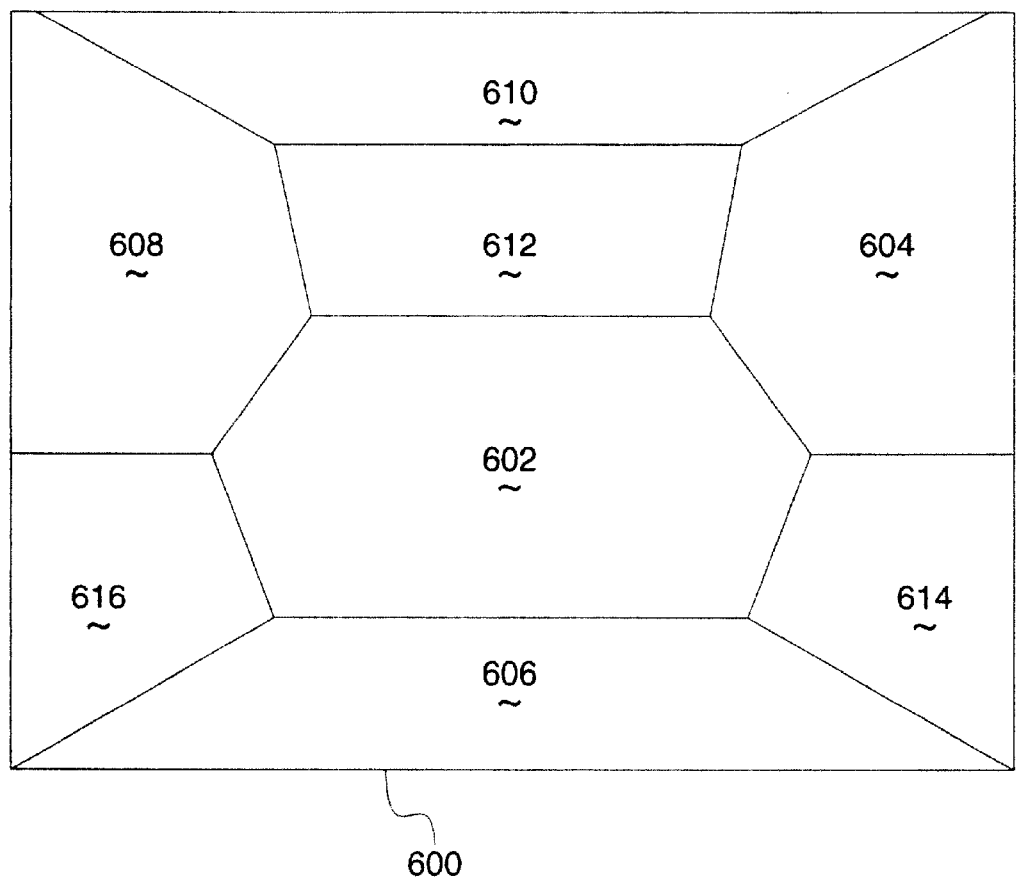
FIG. 10A is a user's view of a display in accordance with an embodiment of the invention.

FIG. 10A is a user's view of a display in accordance with an embodiment of the invention. Box 600 depicts a region of display 12 further partitioned into regions 602, 604, 606, 608, 610, 612, 614 and 616 corresponding to faces 402, 404, 406, 400, 414, 416, 420 and 418 of FIG. 8B, respectively. The user has selected a focal point and orientation in which these faces are visible at the relative proportions projected as displayed.

Figure 10B:
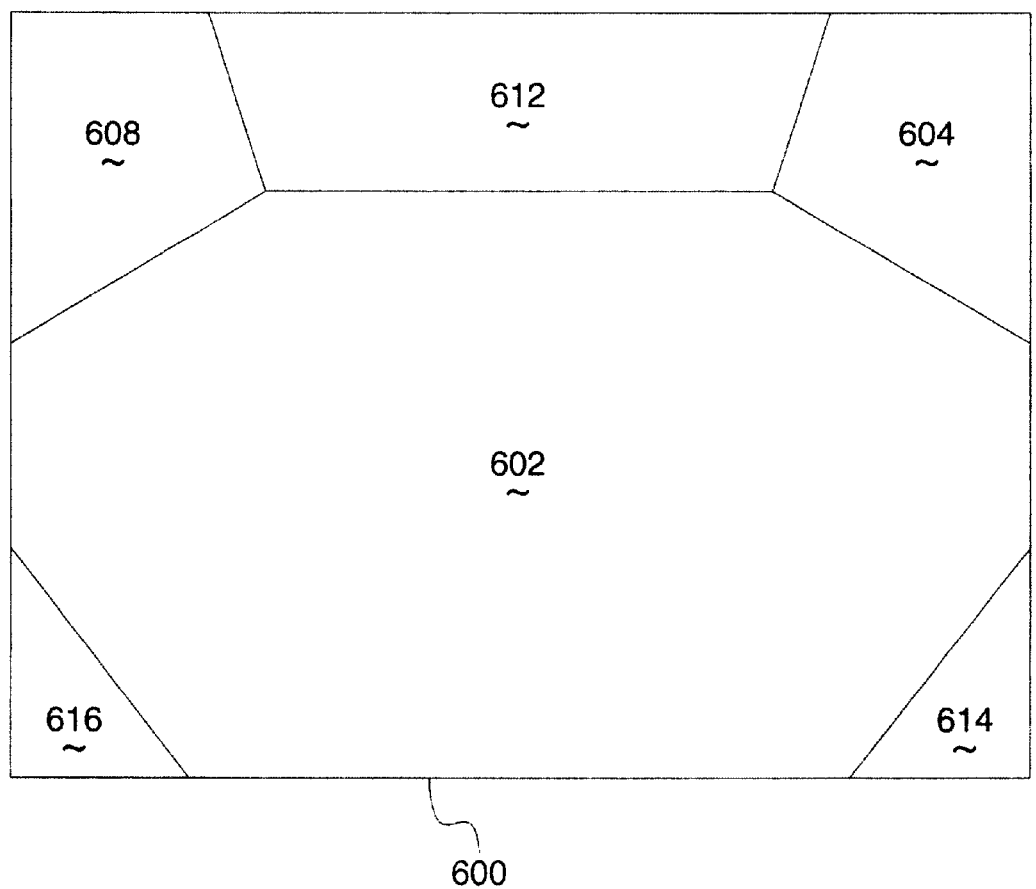
FIG. 10B is another user's view of a display in accordance with an embodiment of the invention.

FIG. 10B is another user's view of a display in accordance with an embodiment of the invention. Box 600 depicts a region of display 12 further partitioned into regions 602, 604, 608, 612, 614 and 616 corresponding to faces 402, 404, 400, 416, 420 and 418 of FIG. 8B, respectively. The user has selected a focal point and orientation in which these faces are visible at the relative proportions projected as displayed. In comparing this figure with FIG. 10A, it can be seen that the orientation has essentially not changed from the previous figure, but the focal point has moved closer to the face 402 of FIG. 8B as shown in the enlargement of region 602. Alternatively, the change in view may be effected by narrowing the field of view in certain preferred embodiments.

Figure 11A:
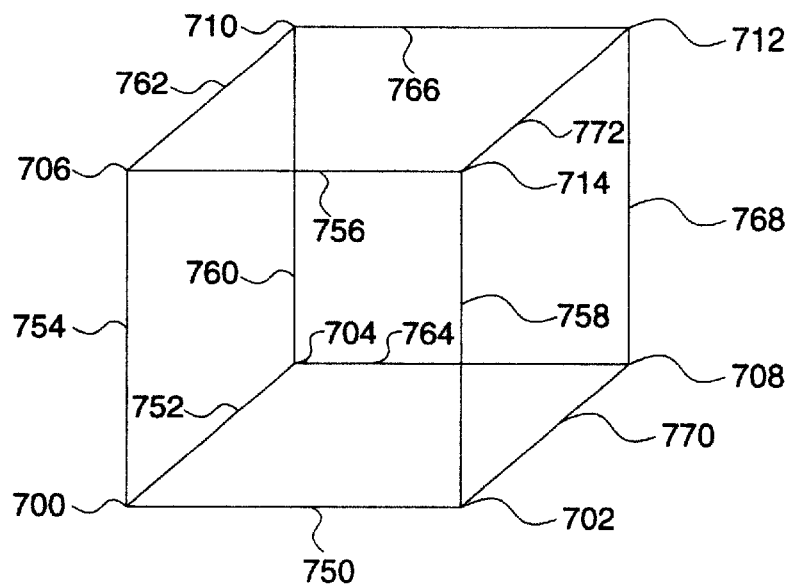
FIG. 11A is a three dimensional cube diagram in accordance with a preferred embodiment.

FIG. 11A is a three dimensional cube diagram in accordance with a preferred embodiment. The cube contains points 700, 702, 704, 706, 708, 710, 712 and 714. These points are connected by lines 750, 752, 754, 756, 758, 760, 762, 764, 766, 768 and 770.

Figure 11B:
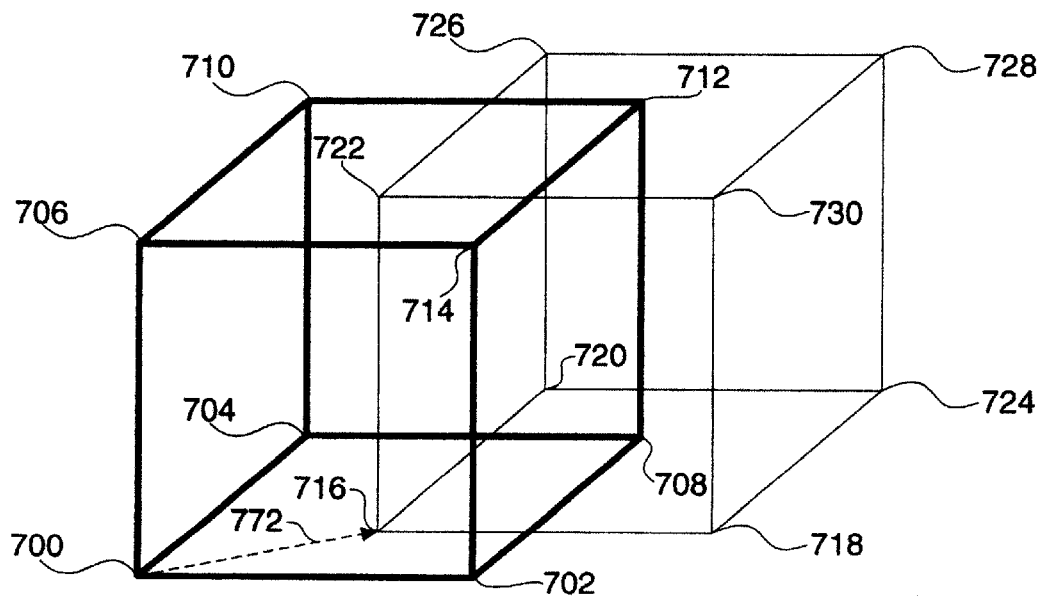
FIG. 11B is a three dimensional cube diagram superimposed on another three dimensional cube diagram displaced from the first cube diagram in a fourth dimension in accordance with a preferred embodiment.

FIG. 11B is a three dimensional cube diagram superimposed on another three dimensional cube diagram displaced 772 from the first cube diagram in a fourth dimension in accordance with a preferred embodiment. The first cube contains points 700, 702, 704, 706, 708, 710, 712 and 714. The second cube contains points 716, 718, 720, 722, 724, 726, 728 and 730 which have been displaced from points 700, 702, 704, 706, 708, 710, 712 and 714, respectively of the first cube in a fourth dimensional direction 772.

Figure 12:
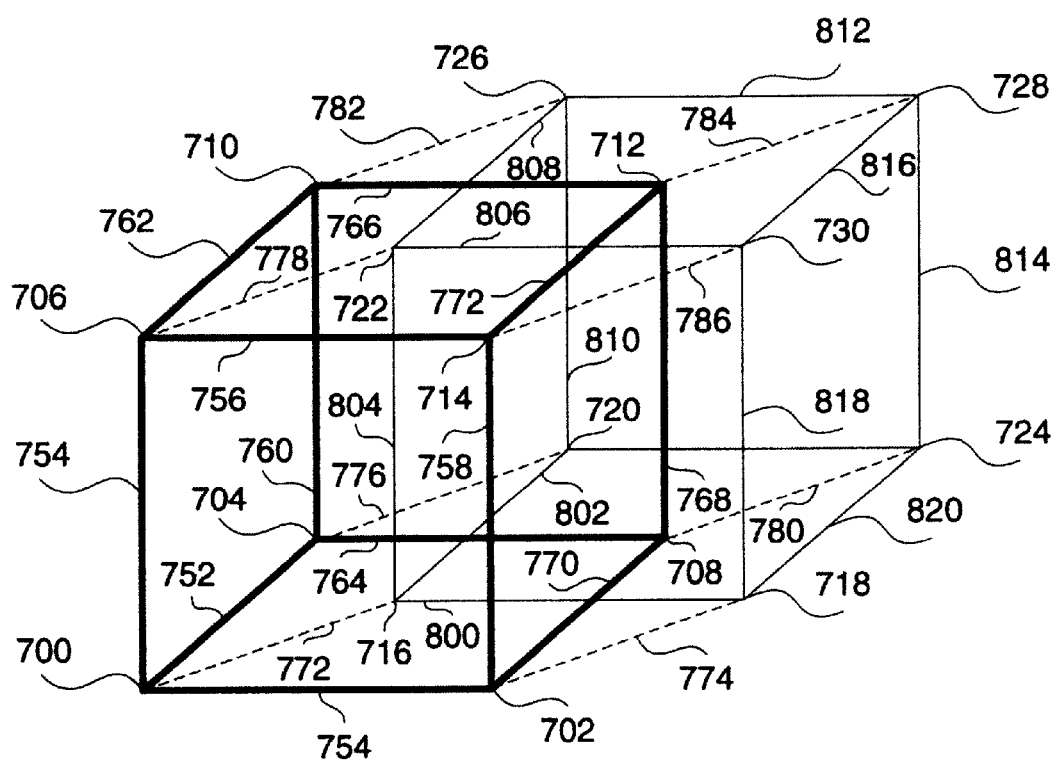
FIG. 12 is a four dimensional cube diagram formed by the translation of the first three dimensional cube diagram to the displaced second three dimensional cube diagram as used for user navigation in accordance with a preferred embodiment.

FIG. 12 is a four dimensional cube diagram formed by the translation of the first three dimensional cube diagram to the displaced second three dimensional cube diagram as used for user navigation in accordance with a preferred embodiment. The first cube contains points 700, 702, 704, 706, 708, 710, 712 and 714. The second cube contains points 716, 718, 720, 722, 724, 726, 728 and 730 which have been displaced in parallel from points 700, 702, 704, 706, 708, 710, 712 and 714, respectively of the first cube in a fourth dimensional direction 772.

Displacement 772 connects points 700 and 716 along a fourth dimension.

Displacement 774 connects points 702 and 718 along this fourth dimension.

Displacement 776 connects points 704 and 720 along this fourth dimension.

Displacement 778 connects points 706 and 722 along this fourth dimension.

Displacement 780 connects points 708 and 724 along this fourth dimension.

Displacement 782 connects points 710 and 726 along this fourth dimension.

Displacement 784 connects points 712 and 728 along this fourth dimension.

Displacement 786 connects points 714 and 730 along this fourth dimension.

The points of the first three-dimensional cube are connected by lines 750, 752, 754, 756, 758, 760, 762, 764, 766, 768 and 770. The points of the second three-dimensional cube are connected by lines 800, 802, 804, 806, 808, 810, 812, 814, 816, 818 and 820. The parallel displacements along this fourth dimension provide the remaining lines of the four-dimensional cube, namely displacements 772, 774, 776, 778, 780, 782, 784 and 786.

Note that in certain embodiments, the dimensions of the topic space are not related to physical dimensions, such a length, width, depth or temporal displacement. They often refer to other entities, such as coloration, scores on specific tests, etc.

FIG. 13 is a tabular graph of points of the four dimensional cube of FIG. 12 and the locations of those points in the four dimensional space in accordance with a preferred embodiment. Associated with each point is a location, denoted by four numerals. Each numeral component of a location is either '0' or '1'.

The first cube contains points 700, 702, 704, 706, 708, 710, 712 and 714 which share a first location component of '0'. The second cube contains points 716, 718, 720, 722, 724, 726, 728 and 730 which have been displaced from points 700, 702, 704, 706, 708, 710, 712 and 714, which share a first location component of '1'. The choice of these designations is in accordance with a preferred embodiment chosen to minimize notational and conceptual complexity. The four dimensional cube is the cube occupying the range from 0 to 1 in each of the four dimensions. The original is point 700, with location '0000'. The four coordinate axes are associated with lines through origin 700 to 702, 704, 706 and 716.

FIG. 14 is a tabular graph of the two dimensional faces of the four dimensional cube, their identification numbers and the named points and their locations in each two dimensional face in accordance with a preferred embodiment. Examining FIG. 12 shows that the four dimensional cube can be seen to contain 24 two-dimensional faces, known hereafter as faces. These faces will be identified by the numbers: 900, 902, 904, 906, 918, 910, 912, 914, 916, 918, 920, 922, 924, 926, 928, 930, 932, 934, 936, 938, 940, 942, 944 and 946. Each face is determined by four points of the four dimensional cube. The four points determining a face vary in only two of the location components across all four of these points. The provided table shows the four points, both in terms of the point identifiers and also in terms of the location notation presented in FIG. 13.

Face 900 is determined by points 700, 702, 704 and 708.
Face 902 is determined by points 700, 702, 706 and 714.
Face 904 is determined by points 700, 704, 706 and 710.
Face 906 is determined by points 706, 710, 712 and 714.
Face 908 is determined by points 704, 710, 712 and 708.
Face 910 is determined by points 702, 714, 712 and 708.
Face 912 is determined by points 716, 718, 720 and 724.
Face 914 is determined by points 716, 718, 722 and 730.
Face 916 is determined by points 716, 720, 722 and 726.
Face 918 is determined by points 722, 726, 728 and 730.
Face 920 is determined by points 720, 726, 728 and 724.
Face 922 is determined by points 718, 730, 728 and 724.
Face 924 is determined by points 700, 716, 718 and 702.
Face 926 is determined by points 700, 716, 722 and 706.
Face 928 is determined by points 702, 718, 730 and 714.
Face 930 is determined by points 706, 714, 730 and 722.
Face 932 is determined by points 704, 720, 724 and 708.
Face 934 is determined by points 704, 720, 710 and 726.
Face 936 is determined by points 708, 724, 728 and 712.
Face 938 is determined by points 726, 712, 728 and 710.
Face 940 is determined by points 700, 716, 704 and 720.
Face 942 is determined by points 706, 722, 710 and 726.
Face 944 is determined by points 702, 718, 708 and 724.
Face 946 is determined by points 714, 730, 712 and 728.

The contents of the four-dimensional cube can be examined by presenting the projections of those contents upon one or more of these faces. Such a representation is two-dimensional, since the projections onto each face must be two-dimensional.

Figure 15A:
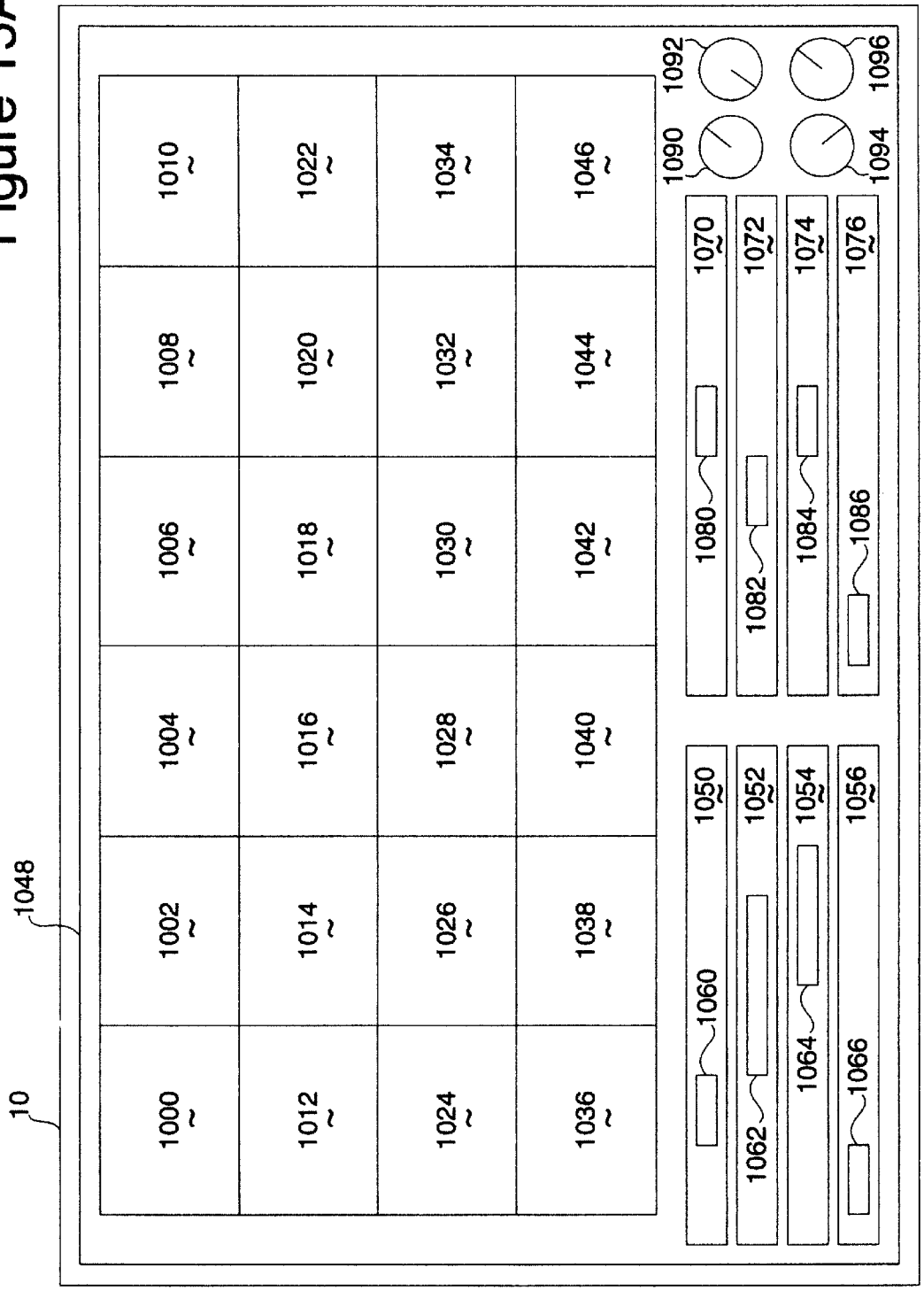
FIG. 15A is a diagram of a user interface showing the two dimensional faces of the four dimensional cube of FIG. 12, topic space parameter controls, focal location and orientation controls in accordance with a preferred embodiment.

FIG. 15A is a diagram of a user interface showing the two dimensional faces of the four dimensional cube of FIG. 12, topic space parameter controls, focal location and orientation controls in accordance with a preferred embodiment.

Regions 1000, 1002, 1004, 1006, 1018, 1010, 1012, 1014, 1016, 1018, 1020, 1022, 1024, 1026, 1028, 1030, 1032, 1034, 1036, 1038, 1040, 1042, 1044 and 1046 are used to display the four-dimensional cube contents onto faces 900, 902, 904, 906, 918, 910, 912, 914, 916, 918, 920, 922, 924, 926, 928, 930, 932, 934, 936, 938, 940, 942, 944 and 946. Identifier 1048 will hereafter represent the collection of displayed face projections, which will be considered to be all of the regions 1000, 1002, 1004, 1006, 1018, 1010, 1012, 1014, 1016, 1018, 1020, 1022, 1024, 1026, 1028, 1030, 1032, 1034, 1036, 1038, 1040, 1042, 1044 and 1046.

Note that in certain preferred embodiments, each of the regions corresponds to a distinct face projection of the four dimensional cube. In certain other embodiments, there are fewer than 24 regions, so that less than all the face projections are displayed. In certain other embodiments, one or more of the regions may display the same face. In certain further embodiments, there are more than the displayed 24 regions, with the contents of certain regions being identical, except perhaps for being rotated or flipped. In certain preferred embodiments, the regions are not all the same size.

Sliders 1050, 1052, 1054 and 1056 control the range of each coordinate axis of the topic space four-dimensional cube as diagrammed and discussed in FIGS. 11A, 11B, 12, 13 and 14 above. Slider 1050 contains a selection range 1060. Slider 1052 contains a selection range 1062. Slider 1054 contains a selection range 1064. Slider 1056 contains a selection range 1066.

Sliders 1070, 1072, 1074 and 1076 control the focal point with regards to the four-dimensional cube as diagrammed and discussed in FIGS. 11A, 11B, 12, 13 and 14 above. Slider 1070 contains setting 1080. Slider 1072 contains setting 1082. Slider 1074 contains setting 1084. Slider 1076 contains setting 1086. Dials 1090, 1092, 1094 and 1096 control and display the current orientation of the focal point with regards to the four-dimensional cube as diagrammed and discussed in FIGS. 11A, 11B, 12, 13 and 14 above.

Figures 15B, 15C:
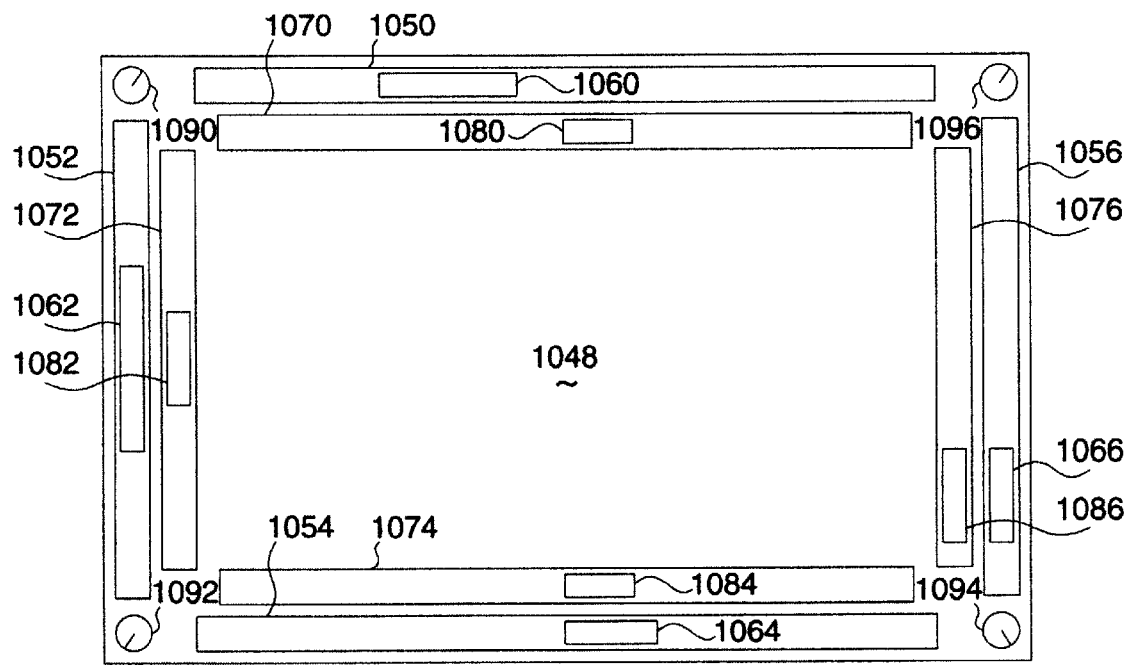
FIG. 15B is a diagram of a user interface showing the display region 1048 of two dimensional faces, topic space parameter controls, focal location and orientation controls in accordance with another preferred embodiment.
FIG. 15C is a detail diagram showing a portion of the display region 1048 in which four exemplary two dimensional faces are displayed in accordance with a preferred embodiment.

FIG. 15B is a diagram of a user interface showing the display region 1048 of two-dimensional faces, topic space parameter controls, focal location and orientation controls in accordance with another preferred embodiment. Sliders 1050, 1052, 1054 and 1056 controlling the range of each coordinate axis of the topic space four-dimensional cube are distributed along each side of display regions 1048. Sliders 1070, 1072, 1074 and 1076 each controlling one coordinate setting of the focal point of the four-dimensional cube are distributed along each side of display regions 1048.

Dials 1090, 1092, 1094 and 1096 control and display the current orientation of the focal point with regards to the four-dimensional cube are distributed in each of the corners of the display regions 1048.

FIG. 15C is a detail diagram showing a portion of the display region 1048 in which four exemplary two-dimensional faces, 1000, 1002, 1012 and 1014 are displayed in accordance with a preferred embodiment. Region 1000 presents the projection upon face 900, as determined by points 700, 702, 704 and 708. Region 1002 presents the projection upon face 902, as determined by points 700, 702, 706 and 714. Region 1012 presents the projection upon face 912, as determined by points 716, 718, 720 and 724. Region 1014 presents the projection upon face 914, as determined by points 716, 718, 722 and 730.

Note that each region is oriented in its display by the corner placement of each determining point in certain preferred embodiments. Certain further preferred embodiments use a location notation such as found FIG. 13 to denote the determining points of a region's face. These point notations may appear outside their associated region in certain preferred embodiment. In certain further preferred embodiments, these locations are denoted by graphical symbols. In certain preferred embodiments, adjacent regions may share a pair of common points, thus share a common line segment.

Figure 16:
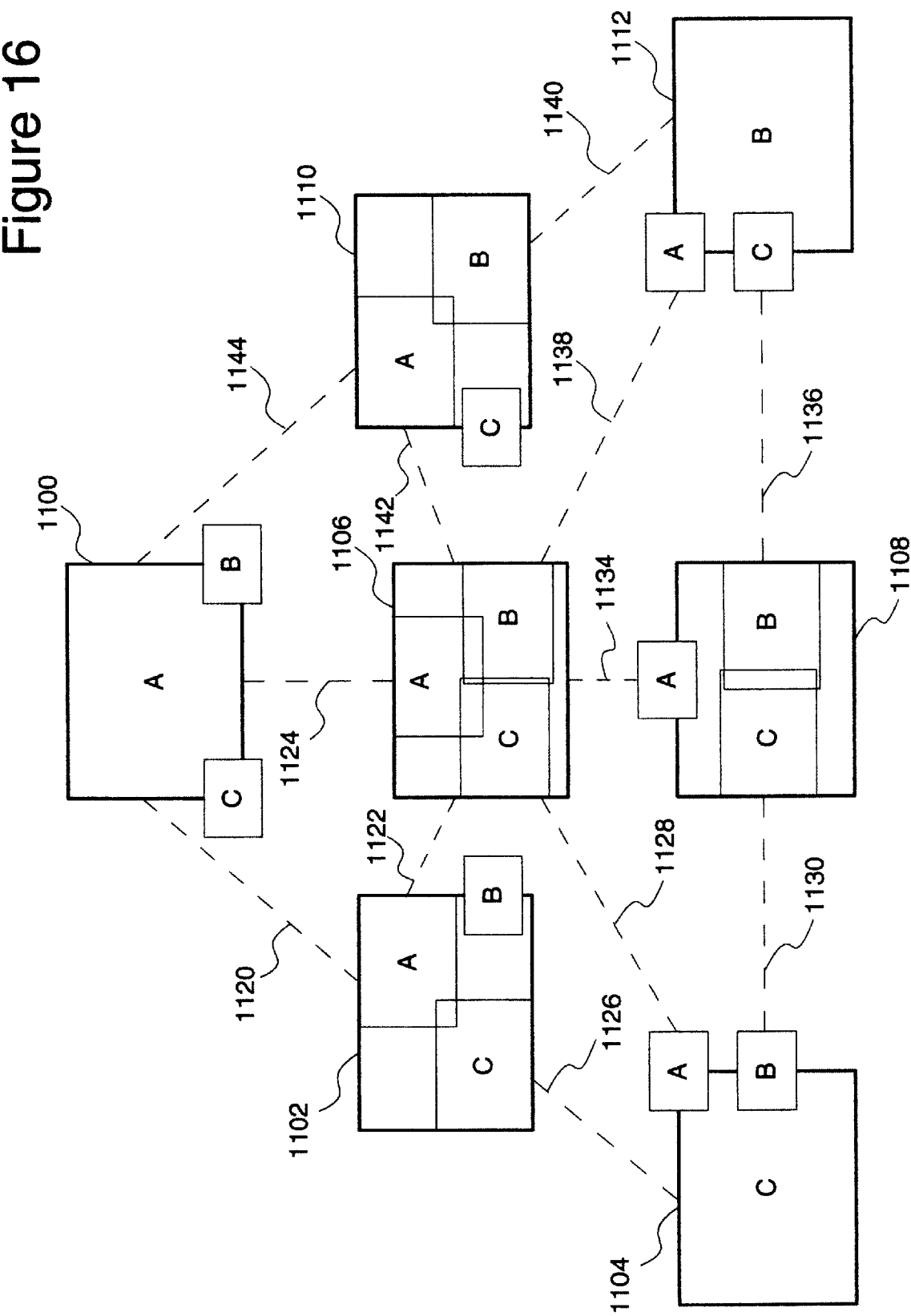
FIG. 16 is a diagram showing several transformations of selected content as displayed in response to changes in focal location and/or orientation in accordance with a preferred embodiment.

FIG. 16 is a diagram showing several transformations of selected content as displayed in response to changes in focal location and/or orientation in accordance with a preferred embodiment. By way of example, three content representations A, B and C are presented in the presentations 1100, 1102, 1104, 1106, 1108, 1110 and 1112. Lines 1120, 1122, 1124, 1126, 1128, 1130, 1134, 1136, 1138, 1140, 1142 and 1144 represent display transitions effected by motion of the focal point determined by the system. A user or software agent may effect such focal point motion in certain preferred embodiments.

Transition 1120 is between display combination 1100 and 1102. Display combination 1100 shows a large displayed content region A, with smaller regions B and C. Display combination 1102 shows displayed content regions A and C comparable in size and slightly overlapping, with region B being smaller and non-overlapping. Suppose that display combination 1100 is presented, and that a user moves a pointing device such as a mouse toward the display region C. The system would display combination 1102 by way of transition 1120. Suppose instead that display combination 1102 is presented, and that a user moves a pointing device such as a mouse toward the display region A. The system would display combination 1100 by way of transition 1120.

Note that this symmetry of moving a pointing device toward something and a particular transition occurs, move it in the opposite direction and the reverse transition occurs will be assumed from hereon in the discussion of this and other figures. This has been done to simplify the discussion and is not meant to communicate a lack of symmetry between the motion of the focal point and the displayed contents.

Transition 1122 is between display combination 1102 and 1106. Transition 1124 is between display combination 1100 and 1106. Display combination 1106 shows displayed content regions A, B and C where the three regions are approximately the same size and all of them overlap. Suppose that display combination 1100 is presented, and that a user moves a pointing device such as a mouse toward midpoint between display region B and C. The system would display combination 1106 by way of transition 1124. Suppose instead that display combination 1102 is presented, and that a user moves a pointing device such as a mouse toward the display region B. The system would display combination 1106 by way of transition 1122.

Transition 1126 is between display combination 1102 and 1104. Transition 1128 is between display combination 1106 and 1104. Display combination 1104 shows a large displayed content region C, with smaller regions B and A. Suppose that display combination 1102 is presented, and that a user moves a pointing device such as a mouse toward display region C. The system would display combination 1104 by way of transition 1126. Suppose instead that display combination 1106 is presented, and that a user moves a pointing device such as a mouse toward the display region C. The system would display combination 1104 by way of transition 1128.

Transition 1130 is between display combination 1104 and 1108. Transition 1134 is between display combination 1106 and 1108. Display combination 1108 shows displayed content regions B and C approximately the same size and overlapping with displayed content region A smaller and non-overlapping. Suppose that display combination 1106 is presented, and that a user moves a pointing device such as a mouse downward near the midpoint between display regions B and C. The system would display combination 1108 by way of transition 1134. Suppose instead that display combination 1104 is presented, and that a user moves a pointing device such as a mouse toward the display region B. The system would display combination 1108 by way of transition 1130.

Transition 1136 is between display combination 1108 and 1112. Transition 1138 is between display combination 1106 and 1112. Display combination 1112 shows displayed content region B larger in size and overlapping with displayed content regions A and C, which are smaller and overlap with B. Suppose that display combination 1106 is presented, and that a user moves a pointing device such as a mouse toward display region B. The system would display combination 1112 by way of transition 1138. Suppose instead that display combination 1108 is presented, and that a user moves a pointing device such as a mouse toward the display region B. The system would display combination 1112 by way of transition 1136.

Transition 1142 is between display combination 1106 and 1110. Transition 1140 is between display combination 1112 and 1110. Display combination 1110 shows displayed content regions A and B comparable in size and slightly overlapping, with region C being smaller and non-overlapping. Suppose display combination 1106 is presented, and that a user moves a pointing device such as a mouse toward the midpoint between display regions A and B. The system would display combination 1110 by way of transition 1142. Suppose instead that display combination 1112 is presented, and that a user moves a pointing device such as a mouse toward the display region A. The system would display combination 1110 by way of transition 1140.

Transition 1144 is between display combination 1100 and 1110. Suppose that display combination 1100 is presented, and that a user moves a pointing device such as a mouse toward display region B. The system would display combination 1110 by way of transition 1144.

Figure 17A:
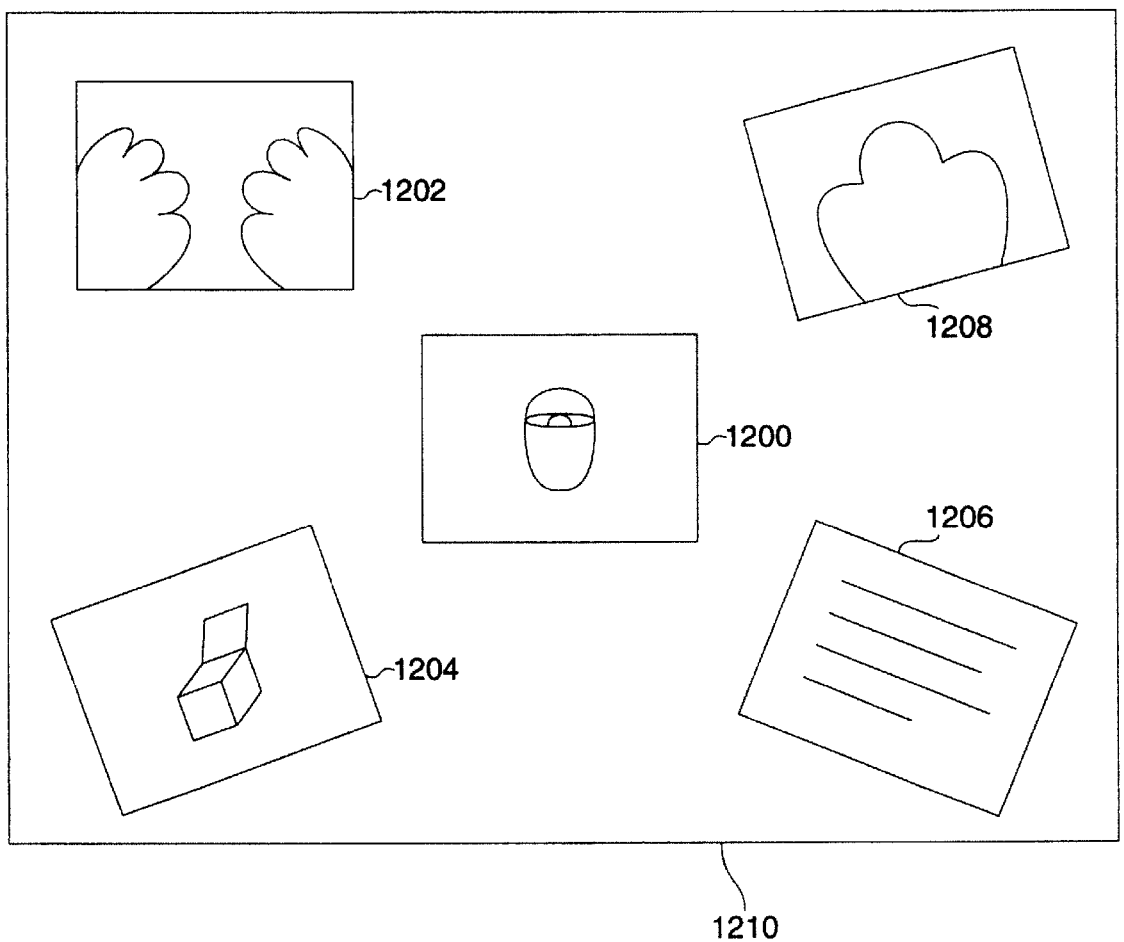
FIG. 17A is a diagram depicting the display of several content representations in accordance with a preferred embodiment.

FIG. 17A is a diagram depicting the display of several content representations in accordance with a preferred embodiment. Display region 1210 contains regions 1200, 1202, 1204, 1206 and 1208. Content 1200 is approximately the same size as 1202, 1204, 1206 and 1208. Note that the sides of content 1200 are not parallel to the sides of 1202, 1204, 1206 and 1208.

Regions 1200, 1202, 1204, 1206 and 1208 show diverse forms of content. Region 1200 may present objects which may each expand into their own presentations. Region 1202 may represent a multimedia sequence in motion. Region 1204 may represent a program interface, such as a user interface to a simulation environment or video game. Region 1206 may represent a text window, which may automatically be scrolling. Region 1208 may represent a still frame, such as a map of San Francisco.

Suppose the user directs a pointing device to move the focal point closer to the content 1200.

Figure 17B:
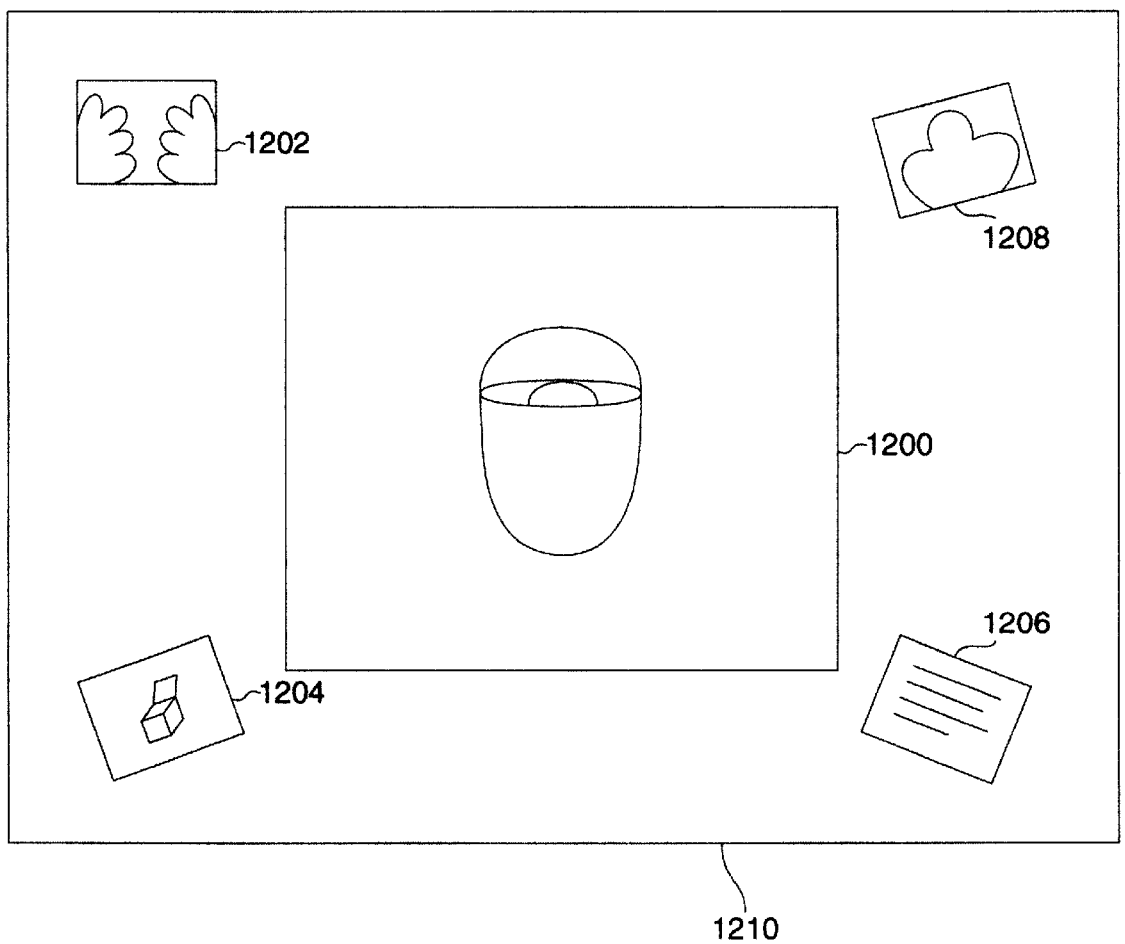
FIG. 17B is a diagram further depicting a transformation of several content representations in accordance with a preferred embodiment.

FIG. 17B is a diagram further depicting a transformation of several content representations in accordance with a preferred embodiment, which results from moving the focal point closer to content 1200. Note that content region 1200 has grown significantly larger than regions 1202, 1204, 1206 and 1208.

Figure 18A:
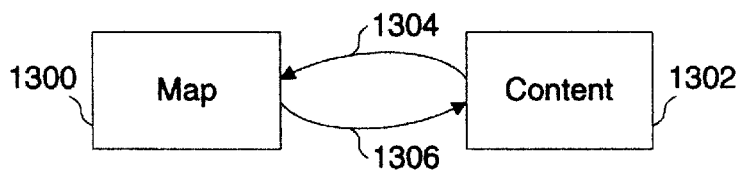
FIG. 18A is a diagram showing interrelationships between content and a map in accordance with a preferred embodiment.

FIG. 18A is a diagram showing interrelationships between content 1302 and a map 1300 in accordance with a preferred embodiment. A preferred embodiment alternatively displays map 1300 and content 1302. The map 1300 influences the traversal and display of content 1302 as represented by arrow 1306. Arrow 1304 represents the referencing of the map 1300 by movement and manipulation of content 1302.

Figure 18B:
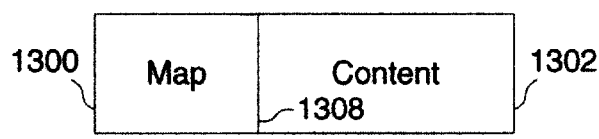
FIG. 18B is a diagram showing interrelationships between content and a map in accordance with another preferred embodiment.

FIG. 18B is a diagram showing interrelationships between content 1302 and a map 1300 in accordance with another preferred embodiment, where map 1300 and content 1302 are displayed simultaneously. Boundary 1308 between the displayed content region 1302 and the displayed map region 1300 may be further shown with additional attributes in certain preferred embodiments.

Figure 18C:
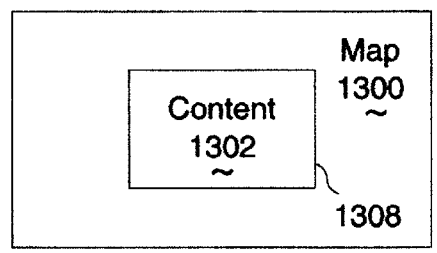
FIG. 18C is a diagram showing interrelationships between content and a map in accordance with another preferred embodiment.

FIG. 18C is a diagram showing interrelationships between content 1302 and a map 1300 in accordance with another preferred embodiment, where content 1302 is displayed within map 1300. Boundary 1308 between the displayed content region 1302 and the displayed map region 1300 may be further shown with additional attributes in certain preferred embodiments.

Figure 18D:
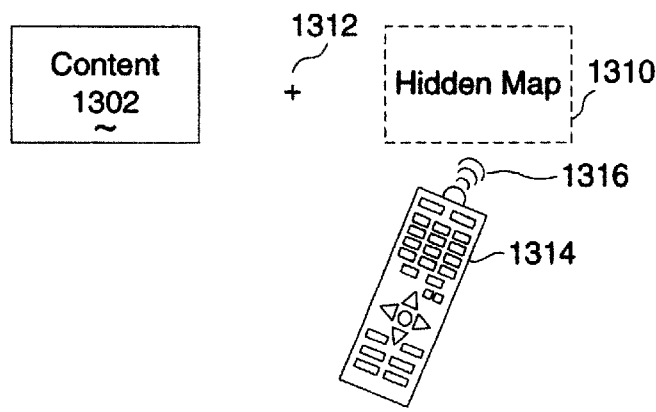
FIG. 18D is a diagram showing interrelationships between content and a map in accordance with another preferred embodiment.

FIG. 18D is a diagram showing interrelationships between content 1302 and a hidden map 1310 in accordance with another preferred embodiment. The hidden map 1310 interacts with displayed content 1302 in a fashion transparent to a user as represented by the '+' sign 1312. A selector device 1314 may be used to direct the system to present content 1302 based upon the hidden map 1310 across a transport mechanism 1316. Alternatively, a system agent may direct the system to present content 1302 based on the hidden map 1310.

Figure 19:
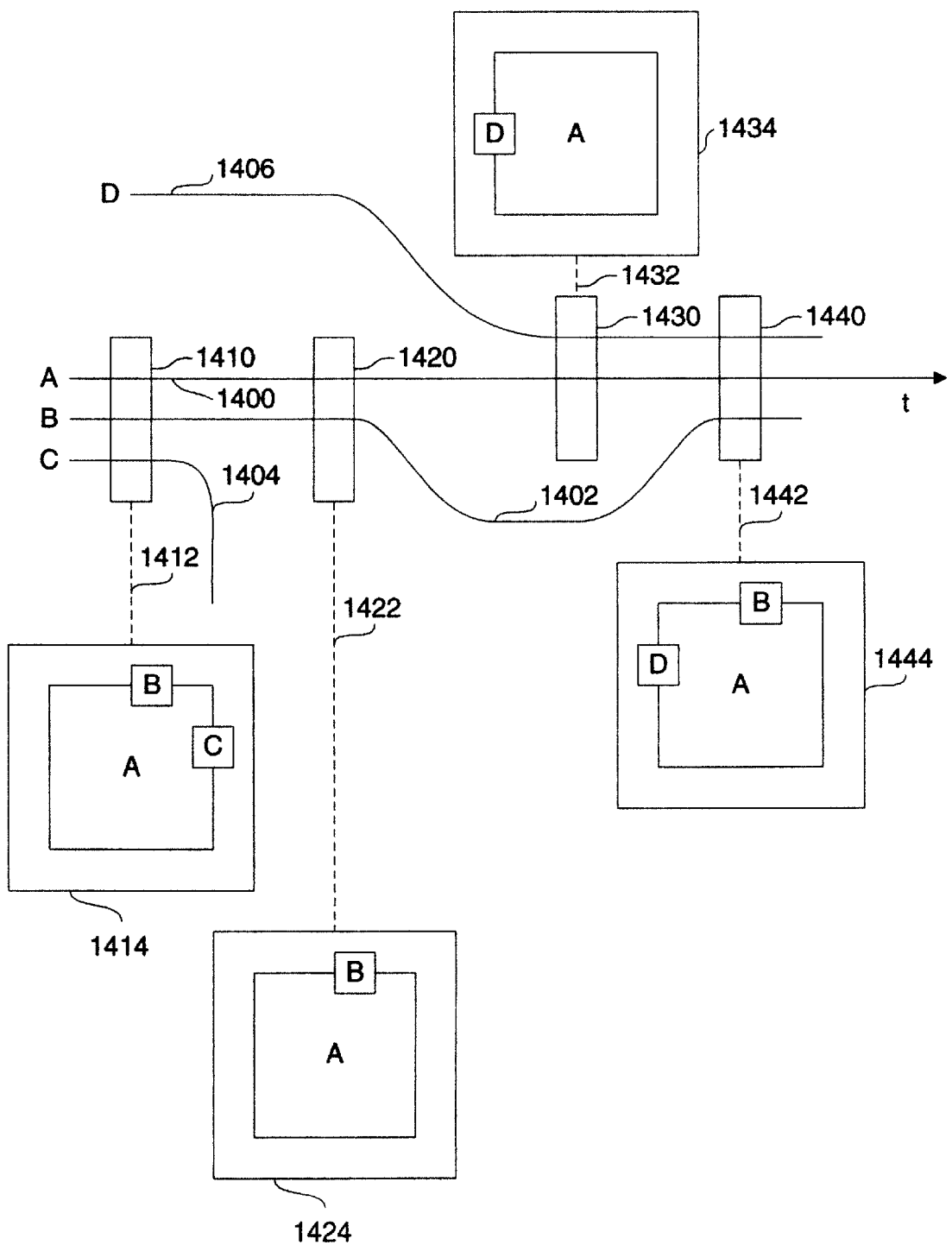
FIG. 19 is a diagram showing the relationship between content in a multi-dimensional topic space and the traversal of content by a viewer over time.

FIG. 19 is a diagram showing the relationship between content in a multi-dimensional topic space and the traversal of content by a viewer over time. Content presentations A, B, C and D each take place of a perceptible interval of time for a user. During each presentation, any moment in a presentation may vary in relevance to the presented material the other content presentations. By way of example, a presentation sequence on Thomas Jefferson may at certain times be close in relevance to the subject of patents, and at other moments in the presentation, be close to the subject of religion, slavery, architecture or languages. This diagram shows by way of example how four illustrative content presentations might be annotated and display such relationships.

Line 1400 shows the time line for a user viewing presentation A, with a user progressing forward in time by progressing from left to right along line 1400. Line 1402 shows the time line for a user viewing presentation B, with a user progressing forward in time by progressing from left to right along line 1402. Line 1404 shows the time line for a user viewing presentation C, with a user progressing forward in time by progressing from left to right along line 1404. Line 1406 shows the time line for a user viewing presentation D, with a user progressing forward in time by progressing from left to right along line 1406.

Box 1410 represents a given moment 1412 for a user viewing presentation A with presentations B and C being close to presentation A as shown in box 1414. Box 1420 represents a given moment 1422 for a user viewing presentation A with only presentation B being close to presentation A as shown in box 1424. Box 1430 represents a given moment 1432 for a user viewing presentation A with only presentation D being close to presentation A as shown in box 1434. Box 1440 represents a given moment 1442 for a user viewing presentation A with presentations D and B being close to presentation A as shown in box 1444.

In certain preferred embodiments, more than one content region would be essentially displayed at the same time. In certain other preferred embodiments, the relations of where content is displayed within the display content boxes may be governed by the geometry inherent in a multi-dimensional space such as displayed and discussed in FIGS. 8A, 8B, 10A and 10B. In certain other preferred embodiments, the relations of where content is displayed within the display content boxes may be governed by the geometry inherent in a multi-dimensional space such as displayed and discussed in FIGS. 11A, 11B, 12 as well as FIGS. 13, 14, 15A, 15B and 15C.

FIG. 20 is a flowchart of a method of displaying, traversing, and displaying content in a multi-dimensional topic space in accordance with a preferred embodiment. Operation 1500 starts the method, which in certain preferred embodiments, incorporates temporary allocation of required system resources for the operations to follow.

Arrow 1502 is the first iteration point of this flowchart, directing execution toward operation 1504, which determines topics in the field of relevance. Operation 1504 will be discussed in greater detail during the discussion of FIGS. 21A and 21B. Operation 1505 determines content related to the topics determined by operation 1504.

Operation 1506 causes the retrieval of content representations. This operation effects transfers between External Interface circuit 500, Topic Space Content Store 502, controlled by Digital Controller 504.

Operation 1508 maps the retrieved content representations into topic space and displays the results. Operation 1508 will be discussed in greater detail during the discussion of FIG. 22.

Arrow 1510 directs execution to operation 1512, which determines whether there has been a change in the field of view. In certain preferred embodiments, such changes may be determined by action of a selector device such as 1314 in FIG. 18D. In certain other preferred embodiments, changes in the field of view may be determined by sliders such as shown in FIGS. 4, 5A and 7A. In certain other preferred embodiments, changes in the field of view may be determined by sliders such as 1070, 1072, 1074 and 1076 as well as dials 1090, 1092, 1094 and 1096 as shown in FIGS. 15A and 15B. In certain other preferred embodiments, changes in the field of view may be determined by one or more system agents.

If there has been no change in the field of view, arrow 1514 directs execution to operation 1516, which determines whether content has been selected. Such selection may be determined by the use of a selection device 1314 in FIG. 18D, or by a system agent. If no content has been selected, arrows 1518 and 1510 direct execution to iterate by executing operation 1512 again.

If operation 1516 determines that some content has been selected, arrow 1520 directs execution to operation 1522, which displays the selected content. This operation may present content including but not limited to motion video, audio sequences and programs executing to portray interactions, such as simulations.

If operation 1512 determined a change of field of view has occurred, arrows 1526, 1524 and 1502 direct execution to operation 1504, discussed above.

In certain preferred embodiments, arrows 1524 and 1502 direct execution to operation 1504 before completion of operation 1522. In certain other preferred embodiments, operations 1512 and/or 1516 may occur essentially concurrently with operation 1522. In certain preferred embodiments, more than one content may be displayed at essentially the same time.

Figure 21A:
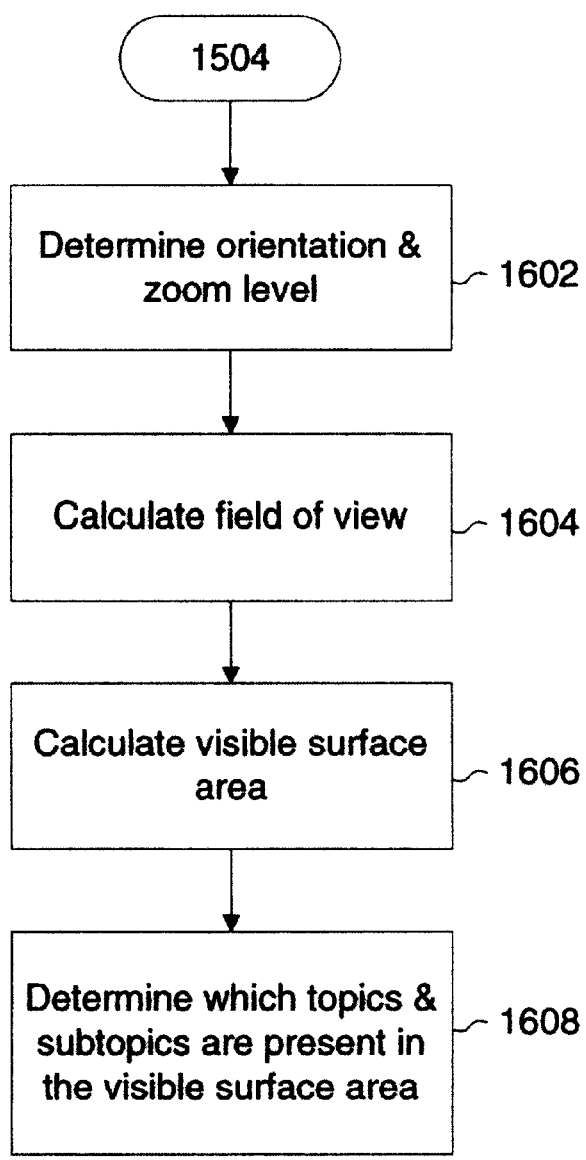
FIG. 21A is a detailed flowchart showing a preferred determination of content related to topics with reference to operation 1504 in FIG. 20 in accordance with a further preferred embodiment.

FIG. 21A is a detailed flowchart showing a preferred determination of content related to topics with reference to operation 1504 in FIG. 20 in accordance with a further preferred embodiment supporting a projection method of mapping the retrieved content representations into topic space and displaying the results.

Operation 1602 determines the orientation and zoom level from the focal point. The zoom level is inversely proportional to the distance between a face and the focal point. This determination can be performed by monitoring sliders and/or dials of a user interface as shown in FIGS. 15A or 15B.

Operation 1604 calculates the field of view given the zoom level and orientation. The field of view will intersect with some, or all, of the bounding surface of the topic space such as the results shown in FIGS. 8A, 8B, 10A and 10B or alternatively as shown in FIGS. 12, 15A and 15C.

Operation 1606 calculates the visual surface area based upon the field of view, zoom level and orientation such as shown in FIGS. 8A, 8B, 10A and 10B or alternatively as shown in FIGS. 12, 15A and 15C.

Operation 1608 determines which topics and subtopics are present in the visible surface area. FIGS. 16, 17A, 17B and 19 provide examples of the results of such determinations.

Figure 21B:
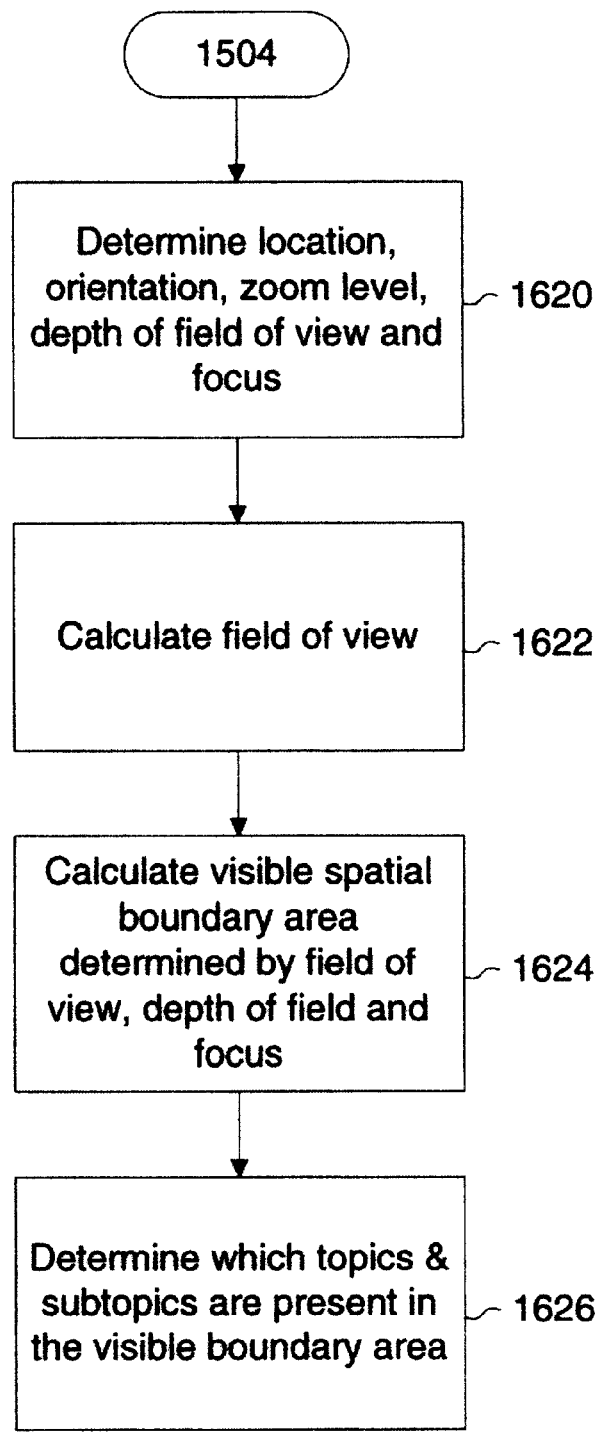
FIG. 21B is another detailed flowchart showing a preferred determination of content related to topics with reference to operation 1504 in FIG. 20 in accordance with an alternative further preferred embodiment.

FIG. 21B is another detailed flowchart showing a preferred determination of content related to topics with reference to operation 1504 in FIG. 20 in accordance with an alternative further preferred embodiment supporting a volumetric projection method of mapping the retrieved content representations into topic space and displaying the results. This approach is particularly useful when the topic space contents contains a large number of items.

Operation 1620 determines the location, orientation, zoom level, depth of field and focus. These parameters operate similarly to comparable imaging parameters in cameras in certain preferred embodiments. In other preferred embodiments, the depth of field and focus can work to chop out rather than fade or blur anything not within a given range of a parameter including but not limited to radial distance from the focus. This determination can be performed by monitoring sliders and/or dials of a user interface as shown in FIGS. 15A or 15B.

Operation 1622 calculates the field of view given the location, orientation, zoom level, depth of field and focus. Operation 1624 calculates the visible spatial boundary area determined by field of view, depth of field and focus. The field of view will intersect with some, or all, of the bounding surface of the topic space such as shown in FIGS. 8A, 8B, 10A and 10B or alternatively as shown in FIGS. 12, 15A and 15C.

Operation 1626 determines which topics and subtopics are present in the visible boundary area. FIGS. 16, 17A, 17B and 19 provide examples of such determinations.

Figure 22:
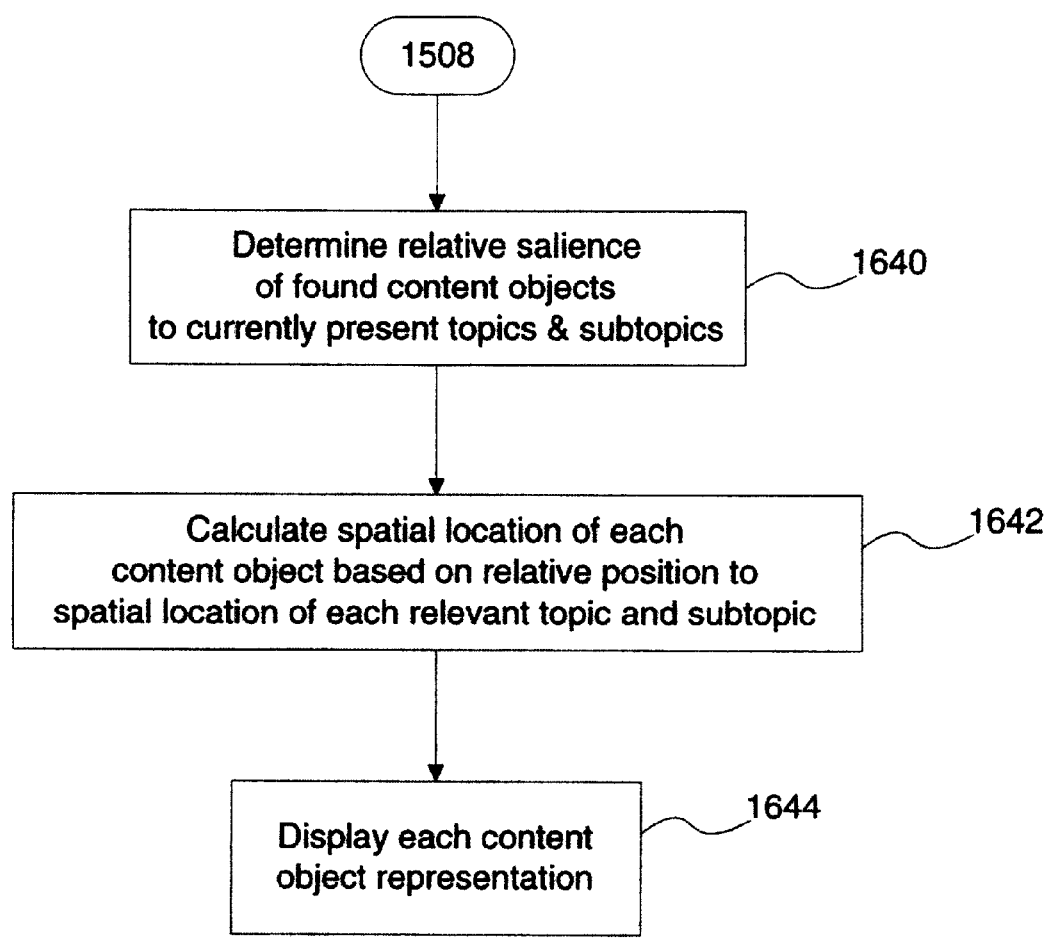
FIG. 22 is a detailed flowchart showing mapping a representation of content in topic space and display with reference to operation 1508 in FIG. 20 in accordance with a further preferred embodiment.

FIG. 22 is a detailed flowchart mapping a representation of content in topic space and display with reference to operation 1508 in FIG. 20 in accordance with a further preferred embodiment.

Operation 1640 determines salience of found content objects to currently present topics and subtopics. Found content objects may represent the coordinate axes in certain preferred embodiments. Examples of these embodiments may be seen in FIGS. 4, 5A, 5B, 6B, 11A and 12. Found content objects may represent interdependent relationships in certain alternative embodiments as shown in FIGS. 6A, 7A and 7B.

Operation 1642 calculates the spatial location of each content object on relative position to spatial location of each element topic and subtopic and operation 1644 displays each content object representation. Examples of the results of these operations are seen in FIGS. 7B, 16, 17A and 17B.

Figure 23A:
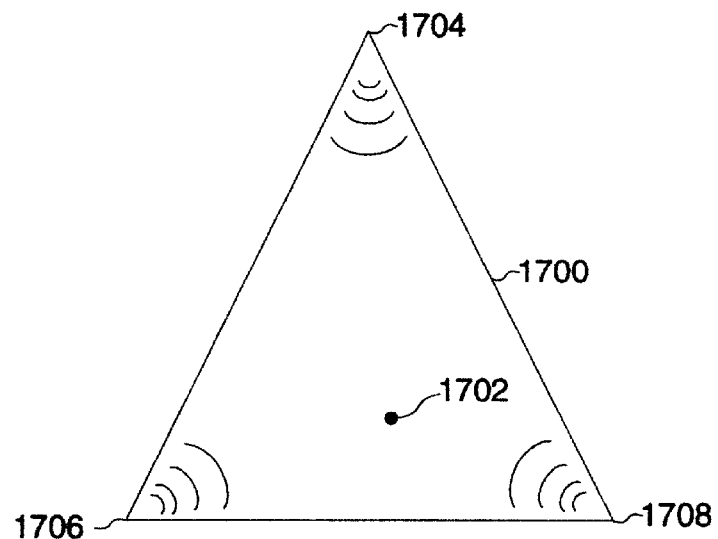
FIG. 23A is a diagram showing a topic space with a focal point and three topics, each possessing a voice in accordance with a preferred embodiment.

FIG. 23A is a diagram showing a topic space with a focal point and three topics, each possessing a voice in accordance with a preferred embodiment. The topic space 1700 is an interrelated topic space with topical objects 1704, 1706 and 1708. The focal point 1702 is a distance from each of the topic objects 1704, 1706 and 1708. Each voice can be considered to be playing a different melodic component, so that the user virtually located at focal point 1702 experiences proximity and direction based upon the mixing of the voices of the content objects in proportions relative to the respective distances from topics 1704, 1706 and 1708.

Figure 23B:
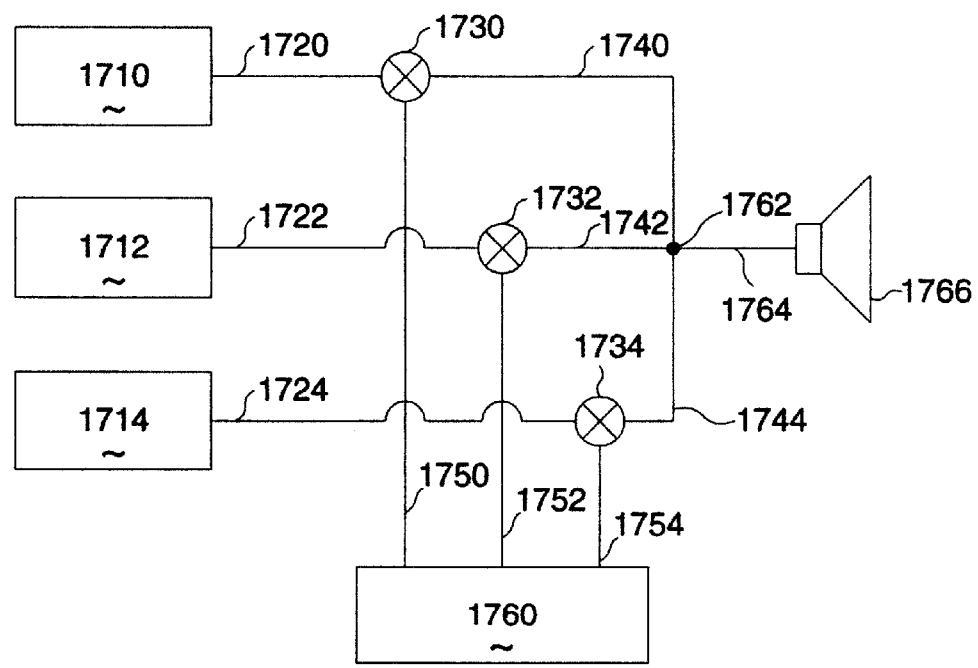
FIG. 23B is a block diagram showing one channel of the displayed (generated) audio content as a function of focal point and the voices of displayed topics in accordance with FIG. 23A in a preferred embodiment.

FIG. 23B is a block diagram showing one channel of the displayed (generated) audio content as a function of focal point and the voices of displayed topics in accordance with FIG. 23A in a preferred embodiment.

Box 1710 generates the voice for topic object 1704 as signal 1720 which is amplified by 1730 based upon control signal 1750 from box 1760 to create signal 1740. Box 1712 generates the voice for topic object 1706 as signal 1722 which is amplified by 1732 based upon control signal 1752 from box 1760 to create signal 1742. Box 1714 generates the voice for topic object 1708 as signal 1724 which is amplified by 1734 based upon control signal 1754 from box 1760 to create signal 1744. Node 1762 effectively adds signals 1740, 1742 and 1744 to generate signal 1764 which then drives output speaker 1766. Note that node 1762 may further incorporate power amplification in certain preferred embodiments. In certain other preferred embodiments, signal 1720, 1722 and 1724 are combined prior to amplification.

The invention is implemented on an interactive video composition tool built in Macromedia Director on a PowerPC processor utilizing a MacOS operating system. The topic space was modeled in Strata Studio Pro and rendered into a QuickTime virtual reality scene with hot-spots using Apple's QuickTime VR software development toolkit extensions to the Macintosh Programmers Workshop application. Pan and zoom controls are provided to facilitate direct manipulation navigation and a set of four topic focusing toggle buttons are provided for specifying interest in the presence of individual vectors or intersections of the vectors which can be set by a user to rotate and zoom the view to focus on that surface of the TopicSpace. A status bar is also provided to indicate and detail the current topic focus. One of ordinary skill in the art will readily comprehend that a VRML version of the system could place a user in the center of a volumetric representation and provide the illusion of the display occurring around the user. As the video which is annotated with topics distributed in the space is played, the user's point of view traverses the space coordinated with the track of the video.

An alternative embodiment consists of a series of software filters set by check boxes or state buttons with resultant intersections displayed in a dedicated window pane. This technique requires a targeted search and a separate visualization step to allow a user to navigate through the information. Because the range of potential advantage extends across a variety of applications for a variety of media types, operating system and development system vendors will incorporate this functional capability into products to provide application developers access to these powerful tools.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for displaying information in a multi-dimensional topic space on a display, comprising:

mapping content representative of at least one topic on the display as a multidimensional topic space;

assigning a vector to one or more of the topics;

determining a focal point based on one or more of the topics; and displaying content pertaining to the topics based upon the vector as the vector correlates with the focal point.

2. A method for displaying information in a multi-dimensional topic space on a display as recited in claim 1, wherein a user action results in a dynamic mapping of a view of the content.

3. A method for displaying information in a multi-dimensional topic space on a display as recited in claim 2, wherein a topic influences the display of the information.

4. A method for displaying information in a multi-dimensional topic space on a display as recited in claim 1, wherein content influences the view to expose additional detail pertaining to the display of information.

5. A method for displaying information in a multi-dimensional topic space on a display as recited in claim 1, wherein a field of relevance includes detecting a change of the field of relevance to provide display of information pertaining to the field of relevance based on the change.

6. A method for displaying information in a multi-dimensional topic space on a display as recited in claim 1, including the step of utilizing a user position to map content representative of the topic in a field of relevance on the display.

7. A method for displaying information in a multi-dimensional topic space on a display as recited in claim 1, including the step of mapping the content representative of the topic in a field of relevance in a multi-dimensional manner and navigating to a topic in the field of relevance in a multi-dimensional manner.

8. A method for displaying information in a multi-dimensional topic space on a display as recited in claim 1, including the step of mapping the content representative of the topic in a field of relevance on a plurality of projection surfaces on the display.

9. A method for displaying information on a display as recited in claim 8, including the step of mapping the content representative of the topic in the field of relevance on a plurality of projection surfaces of a polyhedron on a display.

10. A computer program embodied on a computer readable medium for displaying information in a multi-dimensional topic space on a display, comprising:

code for mapping content representative of at least one topic on the display as a multidimensional topic space;

code for assigning a vector to one or more of the topics;

code for determining a focal point based on one or more of the topics; and code for displaying content pertaining to the topics based upon the vector as the vector correlates with the focal point.

11. A computer program embodied on a computer readable medium for displaying information in a multi-dimensional topic space on a display as recited in claim 10, wherein at least one topic results in a dynamic mapping of a view of the content associated with one or more of the topics.

12. A computer program embodied on a computer readable medium for displaying information in a multi-dimensional topic space on a display as recited in claim 11, wherein a topic influences display of the information.

13. A computer program embodied on a computer readable medium for displaying information in a multi-dimensional topic space on a display as recited in claim 10, wherein content influences a view exposing additional detail pertaining to the content on the display.

14. A computer program embodied on a computer readable medium for displaying information in a multi-dimensional topic space on a display as recited in claim 10, wherein a field of relevance includes detecting a change of the field of relevance and displaying information pertaining to the field of relevance based on the change.

* * * * *